US008885666B2

(12) United States Patent
Tischer et al.

(10) Patent No.: US 8,885,666 B2
(45) Date of Patent: *Nov. 11, 2014

(54) APPARATUS AND METHOD FOR PROVIDING A USER INTERFACE FOR FACILITATING COMMUNICATIONS BETWEEN DEVICES

(71) Applicant: AT&T Intellectual Property I, L.P., Atlanta, GA (US)

(72) Inventors: Steven Tischer, Atlanta, GA (US); Samuel N. Zellner, Dunwoody, GA (US); Robert J. Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/858,747

(22) Filed: Apr. 8, 2013

(65) Prior Publication Data
US 2013/0237145 A1    Sep. 12, 2013

Related U.S. Application Data

(63) Continuation of application No. 12/759,767, filed on Apr. 14, 2010, now Pat. No. 8,416,804, which is a continuation of application No. 11/323,825, filed on Dec. 30, 2005, now abandoned, which is a continuation-in-part of application No. 10/195,197, filed on Jul. 15, 2002, now Pat. No. 7,194,083.

(51) Int. Cl.
*H04J 3/16*    (2006.01)
*H04L 12/66*   (2006.01)
*H04B 7/14*    (2006.01)
*H04W 4/18*    (2009.01)

(52) U.S. Cl.
CPC . *H04B 7/14* (2013.01); *H04W 4/18* (2013.01); *H04L 12/66* (2013.01)
USPC ........ 370/466; 455/414.4; 455/420; 455/557; 370/254; 370/352

(58) Field of Classification Search
CPC .............. H04L 29/06; H04L 29/06068; H04L 29/06095; H04J 3/1635
USPC ........................................................ 370/466
See application file for complete search history.

(56) References Cited

U.S. PATENT DOCUMENTS 3,729,594 A    4/1973  Krock et al.
3,906,166 A    9/1975  Cooper et al.
(Continued)

FOREIGN PATENT DOCUMENTS

EP    0 342 707    11/1989
GB    2 253 119    8/1992
(Continued)

OTHER PUBLICATIONS

US 6,876,861, 04/05/2010, Frank et al. (withdrawn).
(Continued)

Primary Examiner — Mazda Sabouri
(74) Attorney, Agent, or Firm — Hartman & Citrin LLC

(57) ABSTRACT

An apparatus and method for providing a user interface for facilitating communications between devices are provided. According to one aspect, an interface device provides communications between a first device and a second device. The interface device has an input for receiving data in a first format from the first device. Logic within the interface device is configured to receive a request to interact with the interface device and to provide a user interface in response to receiving the request. The logic identifies a second device for receiving the data from the first device. The logic identifies a second format that is compatible with the second device and translates the data to the second format. The interface device further has an output for transmitting the translated data to the second device.

20 Claims, 18 Drawing Sheets

(56) References Cited

U.S. PATENT DOCUMENTS

| | | |
|---|---|---|
| 3,956,596 A | 5/1976 | Connolly et al. |
| 4,218,590 A | 8/1980 | Rasmussen et al. |
| 4,268,722 A | 5/1981 | Little et al. |
| 4,390,963 A | 6/1983 | Puhl et al. |
| 4,398,265 A | 8/1983 | Puhl et al. |
| 4,421,952 A | 12/1983 | Barnes |
| 4,434,461 A | 2/1984 | Puhl |
| 4,485,486 A | 11/1984 | Webb et al. |
| 4,486,624 A | 12/1984 | Puhl et al. |
| 4,528,424 A | 7/1985 | Middleton et al. |
| 4,549,311 A | 10/1985 | McLaughlin |
| 4,575,582 A | 3/1986 | Makino |
| 4,654,655 A | 3/1987 | Kowalski |
| 4,658,096 A | 4/1987 | West, Jr. et al. |
| 4,691,338 A | 9/1987 | Makino |
| 4,706,274 A | 11/1987 | Baker et al. |
| 4,734,928 A | 3/1988 | Weiner et al. |
| 4,737,975 A | 4/1988 | Shafer |
| 4,737,978 A | 4/1988 | Burke et al. |
| 4,741,018 A | 4/1988 | Potratz et al. |
| 4,748,655 A | 5/1988 | Thrower et al. |
| 4,751,725 A | 6/1988 | Bonata et al. |
| 4,775,997 A | 10/1988 | West, Jr. et al. |
| 4,775,998 A | 10/1988 | Felix et al. |
| 4,775,999 A | 10/1988 | Williams |
| 4,799,253 A | 1/1989 | Stern et al. |
| 4,843,621 A | 6/1989 | Potratz |
| 4,853,951 A | 8/1989 | Bauer |
| 4,866,762 A | 9/1989 | Pintar |
| 4,868,519 A | 9/1989 | Shafer |
| 4,890,315 A | 12/1989 | Bendixen et al. |
| 4,893,327 A | 1/1990 | Stern et al. |
| 4,922,486 A | 5/1990 | Lidinsky et al. |
| 4,922,517 A | 5/1990 | West, Jr. et al. |
| 5,020,091 A | 5/1991 | Krolopp et al. |
| 5,020,094 A | 5/1991 | Rash et al. |
| 5,046,085 A | 9/1991 | Godsey et al. |
| 5,117,450 A | 5/1992 | Joglekar et al. |
| 5,134,651 A | 7/1992 | Ortiz et al. |
| 5,185,779 A | 2/1993 | Dop et al. |
| 5,222,123 A | 6/1993 | Brown et al. |
| D339,809 S | 9/1993 | Ron |
| 5,257,406 A | 10/1993 | Ito et al. |
| 5,261,121 A | 11/1993 | Hashimoto |
| 5,287,322 A | 2/1994 | Rastegar |
| 5,311,477 A | 5/1994 | Rastegar |
| 5,323,418 A | 6/1994 | Ayerst et al. |
| 5,329,578 A | 7/1994 | Brennan et al. |
| 5,361,297 A | 11/1994 | Ortiz et al. |
| 5,367,558 A | 11/1994 | Gillig et al. |
| 5,375,258 A | 12/1994 | Gillig |
| D354,749 S | 1/1995 | Phillips |
| 5,406,588 A | 4/1995 | Birchler et al. |
| 5,426,689 A | 6/1995 | Griffith et al. |
| 5,430,719 A | 7/1995 | Weisser, Jr. |
| 5,430,761 A | 7/1995 | Bruckert et al. |
| 5,442,680 A | 8/1995 | Schellinger et al. |
| 5,444,433 A | 8/1995 | Gropper |
| 5,444,765 A | 8/1995 | Marui et al. |
| D362,003 S | 9/1995 | Claudio |
| 5,469,465 A | 11/1995 | Birchler et al. |
| 5,469,494 A | 11/1995 | Ortiz Perez et al. |
| 5,471,670 A | 11/1995 | Hess et al. |
| 5,475,734 A | 12/1995 | McDonald et al. |
| 5,475,735 A | 12/1995 | Williams et al. |
| 5,479,480 A | 12/1995 | Scott |
| 5,497,412 A | 3/1996 | Lannen et al. |
| 5,506,887 A | 4/1996 | Emery |
| 5,524,061 A | 6/1996 | Mooney et al. |
| 5,524,137 A | 6/1996 | Rhee |
| 5,528,666 A | 6/1996 | Weigand et al. |
| 5,530,736 A | 6/1996 | Comer et al. |
| 5,533,099 A | 7/1996 | Byrne |
| 5,544,227 A | 8/1996 | Blust et al. |
| 5,546,444 A | 8/1996 | Roach, Jr. et al. |
| 5,548,814 A | 8/1996 | Lorang et al. |
| 5,564,072 A | 10/1996 | Garcia Aguilera et al. |
| 5,574,984 A | 11/1996 | Reed et al. |
| 5,588,041 A | 12/1996 | Meyer, Jr. et al. |
| 5,594,782 A | 1/1997 | Zicker et al. |
| 5,596,625 A | 1/1997 | LeBlanc |
| 5,598,412 A | 1/1997 | Griffith et al. |
| 5,608,655 A | 3/1997 | Moughanni et al. |
| 5,610,910 A | 3/1997 | Focsaneanu et al. |
| 5,611,049 A | 3/1997 | Pitts |
| 5,613,213 A | 3/1997 | Naddell et al. |
| 5,629,976 A | 5/1997 | Loke et al. |
| 5,631,946 A | 5/1997 | Campana et al. |
| 5,659,698 A | 8/1997 | Weng et al. |
| 5,666,487 A | 9/1997 | Goodman et al. |
| 5,668,561 A | 9/1997 | Perrotta et al. |
| 5,673,304 A | 9/1997 | Connor et al. |
| 5,675,629 A | 10/1997 | Raffel et al. |
| 5,689,549 A | 11/1997 | Bertocci et al. |
| 5,689,803 A | 11/1997 | Tayloe |
| 5,703,933 A | 12/1997 | Ghisler |
| 5,706,328 A | 1/1998 | Williman |
| 5,708,659 A | 1/1998 | Rostoker et al. |
| 5,715,293 A | 2/1998 | Mahoney |
| 5,715,296 A | 2/1998 | Schornack et al. |
| 5,721,732 A | 2/1998 | Emeott et al. |
| 5,724,656 A | 3/1998 | Vo et al. |
| 5,742,905 A | 4/1998 | Pepe et al. |
| 5,751,789 A | 5/1998 | Farris et al. |
| 5,757,902 A | 5/1998 | Mitsuo |
| 5,758,281 A | 5/1998 | Emery et al. |
| 5,764,730 A | 6/1998 | Rabe et al. |
| 5,771,453 A | 6/1998 | Haartsen |
| 5,771,459 A | 6/1998 | Demery et al. |
| 5,774,793 A | 6/1998 | Cooper et al. |
| 5,774,805 A | 6/1998 | Zicker |
| 5,774,857 A | 6/1998 | Newlin |
| 5,790,631 A | 8/1998 | Minarczik et al. |
| 5,798,694 A | 8/1998 | Reber et al. |
| 5,801,654 A | 9/1998 | Traylor |
| 5,802,481 A | 9/1998 | Prieto |
| 5,812,637 A | 9/1998 | Schornack et al. |
| 5,818,824 A | 10/1998 | Lu et al. |
| 5,826,034 A | 10/1998 | Albal |
| 5,826,193 A | 10/1998 | Ghisler et al. |
| 5,849,433 A | 12/1998 | Venugopal et al. |
| 5,859,894 A | 1/1999 | Ortiz Perez et al. |
| 5,875,395 A | 2/1999 | Holmes |
| 5,877,821 A | 3/1999 | Newlin et al. |
| 5,878,096 A | 3/1999 | Shao et al. |
| 5,884,193 A | 3/1999 | Kaplan |
| 5,898,679 A | 4/1999 | Brederveld et al. |
| 5,901,359 A | 5/1999 | Malmstrom |
| 5,903,832 A | 5/1999 | Seppanen et al. |
| 5,903,833 A | 5/1999 | Jonsson et al. |
| 5,905,950 A | 5/1999 | Anell |
| 5,911,120 A | 6/1999 | Jarett et al. |
| 5,917,434 A | 6/1999 | Murphy |
| 5,920,596 A | 7/1999 | Pan et al. |
| 5,920,815 A | 7/1999 | Akhavan |
| 5,926,760 A | 7/1999 | Khan et al. |
| 5,937,058 A | 8/1999 | Bleile et al. |
| 5,946,384 A | 8/1999 | Yee et al. |
| 5,946,616 A | 8/1999 | Schornack et al. |
| 5,949,616 A | 9/1999 | Coon et al. |
| 5,966,428 A | 10/1999 | Ortiz Perez et al. |
| 5,970,388 A | 10/1999 | Will |
| 5,978,469 A | 11/1999 | Benson |
| 5,982,762 A | 11/1999 | Anzai et al. |
| 5,982,854 A | 11/1999 | Ehreth |
| 5,983,117 A | 11/1999 | Sandler et al. |
| 5,987,100 A | 11/1999 | Fortman et al. |
| 5,987,678 A | 11/1999 | Ayers |
| 5,995,839 A | 11/1999 | Coursey |
| 6,002,937 A | 12/1999 | Young et al. |
| 6,009,086 A | 12/1999 | Freeburg et al. |
| 6,014,569 A | 1/2000 | Bottum |
| 6,016,107 A | 1/2000 | Kampe et al. |
| 6,016,269 A | 1/2000 | Peterson et al. |

(56) References Cited

U.S. PATENT DOCUMENTS

| | | |
|---|---|---|
| 6,018,665 A | 1/2000 | Chavez et al. |
| 6,026,086 A | 2/2000 | Lancelot et al. |
| 6,028,984 A | 2/2000 | Kimball |
| 6,029,072 A | 2/2000 | Barber |
| 6,031,492 A | 2/2000 | Griffin et al. |
| 6,035,215 A | 3/2000 | Goni et al. |
| 6,035,220 A | 3/2000 | Claudio et al. |
| 6,038,265 A | 3/2000 | Pan et al. |
| 6,044,148 A | 3/2000 | Bleile |
| 6,058,106 A | 5/2000 | Cudak et al. |
| 6,061,439 A | 5/2000 | Bleile et al. |
| 6,072,828 A | 6/2000 | Chun |
| 6,072,858 A | 6/2000 | Bellin |
| 6,072,862 A | 6/2000 | Srinivasan |
| 6,072,869 A | 6/2000 | Becker et al. |
| 6,075,783 A | 6/2000 | Voit |
| 6,078,805 A | 6/2000 | Scott |
| 6,080,690 A | 6/2000 | Lebby et al. |
| 6,114,053 A | 9/2000 | Matsuyama et al. |
| 6,115,388 A | 9/2000 | Chinitz et al. |
| 6,115,604 A | 9/2000 | Lester et al. |
| 6,116,014 A | 9/2000 | Dalla Betta et al. |
| 6,121,881 A | 9/2000 | Bieback et al. |
| 6,122,515 A | 9/2000 | Ito et al. |
| 6,122,531 A | 9/2000 | Nicholls et al. |
| 6,125,126 A | 9/2000 | Hallenstang |
| 6,134,235 A | 10/2000 | Goldman et al. |
| 6,134,314 A | 10/2000 | Dougherty et al. |
| 6,137,466 A | 10/2000 | Moughanni et al. |
| 6,138,026 A | 10/2000 | Irvin |
| 6,141,341 A | 10/2000 | Jones et al. |
| 6,145,084 A | 11/2000 | Zuili et al. |
| 6,148,069 A | 11/2000 | Ekstrom et al. |
| 6,151,500 A | 11/2000 | Cardina et al. |
| 6,151,620 A | 11/2000 | Madsen et al. |
| 6,157,545 A | 12/2000 | Janninck et al. |
| 6,167,271 A | 12/2000 | Parker et al. |
| 6,167,278 A | 12/2000 | Nilssen |
| 6,169,988 B1 | 1/2001 | Asakura |
| 6,188,888 B1 | 2/2001 | Bartle et al. |
| 6,192,231 B1 | 2/2001 | Chapman et al. |
| 6,198,947 B1 | 3/2001 | Barber |
| 6,203,192 B1 | 3/2001 | Fortman |
| 6,208,627 B1 | 3/2001 | Menon et al. |
| 6,212,396 B1 | 4/2001 | Brown et al. |
| 6,212,550 B1 | 4/2001 | Segur |
| 6,222,919 B1 | 4/2001 | Hollatz et al. |
| 6,230,031 B1 | 5/2001 | Barber |
| 6,240,277 B1 | 5/2001 | Bright |
| 6,252,867 B1 | 6/2001 | Pfeil et al. |
| 6,253,088 B1 | 6/2001 | Wenk |
| 6,256,489 B1 | 7/2001 | Lichter et al. |
| 6,259,925 B1 | 7/2001 | Josse |
| 6,272,134 B1 | 8/2001 | Bass et al. |
| 6,282,564 B1 | 8/2001 | Smith et al. |
| 6,295,348 B1 | 9/2001 | Bleile et al. |
| 6,297,646 B1 | 10/2001 | Lang et al. |
| 6,301,474 B1 | 10/2001 | Hartmaier et al. |
| 6,314,299 B1 | 11/2001 | Schreib et al. |
| 6,317,064 B1 | 11/2001 | Ferrer et al. |
| 6,324,410 B1 | 11/2001 | Giacopelli et al. |
| 6,330,247 B1 | 12/2001 | Chang et al. |
| 6,331,972 B1 | 12/2001 | Harris et al. |
| 6,333,919 B2 | 12/2001 | Gaffney |
| 6,339,795 B1 | 1/2002 | Narurkar et al. |
| 6,362,778 B2 | 3/2002 | Neher |
| 6,396,413 B2 | 5/2002 | Hines et al. |
| 6,396,457 B1 | 5/2002 | Gatherer et al. |
| 6,405,027 B1 | 6/2002 | Bell |
| 6,411,802 B1 | 6/2002 | Cardina et al. |
| 6,429,811 B1 | 8/2002 | Zhao et al. |
| 6,434,394 B1 | 8/2002 | Grundvig et al. |
| 6,438,215 B1 | 8/2002 | Skladman et al. |
| 6,442,241 B1 | 8/2002 | Tsumpes |
| 6,449,269 B1 | 9/2002 | Edholm |
| 6,453,154 B1 | 9/2002 | Haber et al. |
| 6,459,688 B1 | 10/2002 | Bursztejn et al. |
| 6,459,776 B1 | 10/2002 | Aktas et al. |
| 6,466,783 B2 | 10/2002 | Dahm et al. |
| 6,466,799 B1 | 10/2002 | Torrey et al. |
| 6,470,028 B1 | 10/2002 | Perry et al. |
| 6,470,187 B1 | 10/2002 | Rosen et al. |
| 6,477,362 B1 | 11/2002 | Raith et al. |
| 6,480,714 B1 | 11/2002 | DePani et al. |
| 6,496,693 B1 | 12/2002 | Tran |
| 6,507,589 B1 | 1/2003 | Ramasubramani et al. |
| 6,515,967 B1 | 2/2003 | Wei et al. |
| 6,526,581 B1 | 2/2003 | Edson |
| 6,529,707 B1 | 3/2003 | Dent |
| 6,529,746 B1 | 3/2003 | Kotzin |
| 6,542,497 B1 | 4/2003 | Curry et al. |
| 6,573,938 B1 | 6/2003 | Schulz et al. |
| 6,577,952 B2 | 6/2003 | Geier et al. |
| 6,600,734 B1 | 7/2003 | Gernert et al. |
| 6,615,056 B1 | 9/2003 | Taylor et al. |
| 6,631,120 B1 | 10/2003 | Milbrandt |
| 6,639,917 B1 | 10/2003 | Ellington et al. |
| 6,643,709 B1 | 11/2003 | Kwon |
| 6,690,923 B1 | 2/2004 | Ortiz Perez et al. |
| 6,701,352 B1 | 3/2004 | Gardner et al. |
| 6,704,317 B1 | 3/2004 | Dobson |
| 6,704,580 B1 | 3/2004 | Fintel |
| 6,707,888 B1 | 3/2004 | Cope |
| 6,714,797 B1 | 3/2004 | Rautila |
| D490,063 S | 5/2004 | Miller |
| D490,066 S | 5/2004 | Lytel |
| D490,067 S | 5/2004 | Haney |
| 6,741,835 B2 | 5/2004 | Pulver |
| D490,794 S | 6/2004 | Rathmell |
| D491,159 S | 6/2004 | Lytel |
| 6,757,528 B1 | 6/2004 | Cardina et al. |
| 6,775,522 B2 | 8/2004 | Schornack et al. |
| 6,775,552 B2 | 8/2004 | Link, II |
| 6,778,824 B2 | 8/2004 | Wonak et al. |
| 6,781,481 B2 | 8/2004 | Richardson |
| 6,782,003 B1 | 8/2004 | Giroux et al. |
| 6,785,517 B2 | 8/2004 | Schornack et al. |
| 6,788,953 B1 | 9/2004 | Cheah et al. |
| 6,792,095 B1 | 9/2004 | Frank |
| 6,801,159 B2 | 10/2004 | Swope et al. |
| 6,801,793 B1 | 10/2004 | Aarnio et al. |
| 6,801,934 B1 | 10/2004 | Eranko |
| 6,825,762 B2 | 11/2004 | Giacopelli et al. |
| 6,829,501 B2 | 12/2004 | Nielsen et al. |
| 6,832,082 B1 | 12/2004 | Ramasawamy et al. |
| 6,832,093 B1 | 12/2004 | Ranta |
| 6,865,384 B2 | 3/2005 | Sagi et al. |
| 6,900,772 B2 | 5/2005 | Pulver |
| 6,920,144 B2 | 7/2005 | Niermann |
| 6,920,313 B2 | 7/2005 | Trombatore |
| 6,922,170 B2 | 7/2005 | Alexander, Jr. |
| 6,922,432 B2 | 7/2005 | Callaway, Jr. et al. |
| 6,940,820 B2 | 9/2005 | Fang |
| 6,947,738 B2 | 9/2005 | Skog et al. |
| 6,950,674 B2 | 9/2005 | Jarrett |
| 6,961,330 B1 | 11/2005 | Cattan et al. |
| 6,961,575 B2 | 11/2005 | Stanforth |
| 6,978,141 B2 | 12/2005 | Smith et al. |
| 6,978,154 B1 | 12/2005 | Ospalak et al. |
| 6,981,045 B1 | 12/2005 | Brooks |
| 6,996,396 B1 | 2/2006 | Snapp |
| 7,003,287 B2 | 2/2006 | Roeder |
| 7,032,115 B2 | 4/2006 | Kashani |
| 7,035,633 B2 | 4/2006 | Kirkpatrick |
| 7,073,129 B1 | 7/2006 | Robarts et al. |
| 7,079,851 B2 | 7/2006 | Makuta |
| 7,085,566 B2 | 8/2006 | Burchard |
| 7,096,491 B2 | 8/2006 | Cheng |
| 7,099,825 B1 | 8/2006 | Cook |
| 7,120,454 B1 | 10/2006 | Frank |
| 7,130,609 B2 | 10/2006 | Cardina et al. |
| 7,130,616 B2 | 10/2006 | Janik |
| 7,133,795 B1 | 11/2006 | Iaciofano et al. |
| 7,136,358 B2 | 11/2006 | Kunito et al. |

(56) References Cited

U.S. PATENT DOCUMENTS

| | | |
|---|---|---|
| 7,149,514 B1 | 12/2006 | DePani et al. |
| 7,184,768 B2 | 2/2007 | Hind et al. |
| 7,194,083 B1 | 3/2007 | Tischer et al. |
| 7,196,625 B1 | 3/2007 | Nguyen |
| 7,200,424 B2 | 4/2007 | Tischer et al. |
| 7,203,199 B1 | 4/2007 | Duree et al. |
| 7,212,111 B2 | 5/2007 | Tupler et al. |
| 7,218,895 B1 | 5/2007 | Raghavan |
| 7,221,950 B2 | 5/2007 | Frank et al. |
| 7,231,481 B2 | 6/2007 | Scott et al. |
| 7,248,590 B1 | 7/2007 | Liu |
| 7,272,153 B2 | 9/2007 | Cline |
| 7,274,926 B1 | 9/2007 | Laumen et al. |
| 7,274,927 B2 | 9/2007 | Olrik |
| 7,280,817 B2 | 10/2007 | Comp |
| 7,283,519 B2 | 10/2007 | Girard |
| 7,284,147 B2 | 10/2007 | Rao et al. |
| 7,289,616 B2 | 10/2007 | Punaganti et al. |
| 7,308,498 B1 | 12/2007 | Olsen et al. |
| 7,315,553 B2 | 1/2008 | Keller-Tuberg et al. |
| 7,318,099 B2 | 1/2008 | Stahl et al. |
| 7,363,034 B2 | 4/2008 | DePani et al. |
| 7,376,386 B2 | 5/2008 | Phillips et al. |
| 7,392,035 B2 | 6/2008 | Rahman et al. |
| 7,418,492 B1 | 8/2008 | Cohen et al. |
| 7,437,330 B1 | 10/2008 | Robinson et al. |
| 7,440,887 B2 | 10/2008 | Soulet |
| 7,460,510 B2 | 12/2008 | Olivier et al. |
| 7,467,103 B1 | 12/2008 | Murray et al. |
| 7,499,529 B1 | 3/2009 | Kvache et al. |
| 7,522,722 B2 | 4/2009 | Tischer et al. |
| 7,574,523 B2 | 8/2009 | Traversat et al. |
| 7,623,653 B2 | 11/2009 | Tischer et al. |
| 7,630,705 B2 | 12/2009 | Galicia et al. |
| 7,650,415 B1 | 1/2010 | Peterson |
| 2001/0026537 A1 | 10/2001 | Massey |
| 2001/0035459 A1 | 11/2001 | Komai |
| 2001/0037404 A1 | 11/2001 | Hafsteinsson et al. |
| 2001/0040512 A1 | 11/2001 | Hines et al. |
| 2001/0041533 A1 | 11/2001 | Schornack et al. |
| 2001/0049264 A1 | 12/2001 | Balech |
| 2002/0006137 A1 | 1/2002 | Rabenko et al. |
| 2002/0016739 A1 | 2/2002 | Ogasawara |
| 2002/0021669 A1 | 2/2002 | Kunito et al. |
| 2002/0023010 A1 | 2/2002 | Rittmaster et al. |
| 2002/0025832 A1 | 2/2002 | Durian et al. |
| 2002/0027994 A1 | 3/2002 | Katayama et al. |
| 2002/0039892 A1 | 4/2002 | Lindell |
| 2002/0044641 A1 | 4/2002 | Wanner |
| 2002/0045453 A1 | 4/2002 | Juttner et al. |
| 2002/0054667 A1 | 5/2002 | Martinez |
| 2002/0065109 A1 | 5/2002 | Mansikkaniemi et al. |
| 2002/0068544 A1 | 6/2002 | Barzilay et al. |
| 2002/0068558 A1 | 6/2002 | Janik |
| 2002/0073416 A1 | 6/2002 | Catan |
| 2002/0086666 A1 | 7/2002 | Chen |
| 2002/0089998 A1 | 7/2002 | Le |
| 2002/0093948 A1 | 7/2002 | Dertz et al. |
| 2002/0094776 A1 | 7/2002 | Pulver |
| 2002/0098874 A1 | 7/2002 | Zirul et al. |
| 2002/0099663 A1 | 7/2002 | Yoshino et al. |
| 2002/0108121 A1 | 8/2002 | Alao et al. |
| 2002/0123359 A1 | 9/2002 | Wei et al. |
| 2002/0137498 A1 | 9/2002 | Goss et al. |
| 2002/0146977 A1 | 10/2002 | Schornack et al. |
| 2002/0151327 A1 | 10/2002 | Levitt |
| 2002/0156626 A1 | 10/2002 | Hutchison |
| 2002/0160748 A1 | 10/2002 | Rahman et al. |
| 2002/0184517 A1 | 12/2002 | Tadayon et al. |
| 2003/0005135 A1 | 1/2003 | Inoue et al. |
| 2003/0006913 A1 | 1/2003 | Joyce et al. |
| 2003/0008680 A1 | 1/2003 | Huh et al. |
| 2003/0041000 A1 | 2/2003 | Zajac et al. |
| 2003/0050062 A1 | 3/2003 | Chen et al. |
| 2003/0060231 A1 | 3/2003 | Bozionek et al. |
| 2003/0063714 A1 | 4/2003 | Stumer et al. |
| 2003/0067314 A1 | 4/2003 | Kaukko |
| 2003/0074672 A1 | 4/2003 | Daniels |
| 2003/0076672 A1 | 4/2003 | Head |
| 2003/0078029 A1 | 4/2003 | Petite |
| 2003/0096600 A1 | 5/2003 | Lewis et al. |
| 2003/0108189 A1 | 6/2003 | Barzani |
| 2003/0125023 A1 | 7/2003 | Fishler |
| 2003/0128115 A1 | 7/2003 | Giacopelli et al. |
| 2003/0134661 A1 | 7/2003 | Rudd et al. |
| 2003/0137991 A1 | 7/2003 | Doshi et al. |
| 2003/0138050 A1 | 7/2003 | Yamada et al. |
| 2003/0142798 A1 | 7/2003 | Gavette et al. |
| 2003/0145228 A1 | 7/2003 | Suuronen et al. |
| 2003/0156660 A1 | 8/2003 | Zoltowski et al. |
| 2003/0171095 A1 | 9/2003 | Fujinami |
| 2003/0172121 A1 | 9/2003 | Evans et al. |
| 2003/0172218 A1 | 9/2003 | Scott et al. |
| 2003/0187920 A1 | 10/2003 | Redkar |
| 2003/0190018 A1 | 10/2003 | Bleile et al. |
| 2003/0208651 A1 | 11/2003 | Wurzburg |
| 2003/0214775 A1 | 11/2003 | Fukuta et al. |
| 2003/0216134 A1 | 11/2003 | Mutoh |
| 2003/0231594 A1 | 12/2003 | Xu et al. |
| 2003/0235219 A1 | 12/2003 | Kapadia et al. |
| 2003/0236091 A1 | 12/2003 | Wonak et al. |
| 2004/0024660 A1 | 2/2004 | Ganesh et al. |
| 2004/0045096 A1 | 3/2004 | Mani et al. |
| 2004/0067770 A1 | 4/2004 | King et al. |
| 2004/0095316 A1 | 5/2004 | Shibamiya et al. |
| 2004/0131040 A1 | 7/2004 | Gruhl et al. |
| 2004/0132438 A1 | 7/2004 | White |
| 2004/0160372 A1 | 8/2004 | Pulver |
| 2004/0165681 A1 | 8/2004 | Mohan |
| 2004/0174901 A1 | 9/2004 | Ghori et al. |
| 2004/0177310 A1 | 9/2004 | Mohan et al. |
| 2004/0178905 A1 | 9/2004 | Dernier et al. |
| 2004/0203639 A1 | 10/2004 | Ozer et al. |
| 2004/0203705 A1 | 10/2004 | Lundby |
| 2004/0203745 A1 | 10/2004 | Cooper |
| 2004/0203942 A1 | 10/2004 | Dehlin |
| 2004/0205650 A1 | 10/2004 | Cheng |
| 2004/0208119 A1 | 10/2004 | Christodoulou et al. |
| 2004/0214569 A1 | 10/2004 | Cardina et al. |
| 2004/0232770 A1 | 11/2004 | Gisy et al. |
| 2004/0236999 A1 | 11/2004 | Bezuidenhout |
| 2004/0240647 A1 | 12/2004 | Tiliks et al. |
| 2004/0252675 A1 | 12/2004 | Lund |
| 2004/0253945 A1 | 12/2004 | Janik |
| 2004/0266418 A1 | 12/2004 | Kotzin |
| 2004/0267535 A1 | 12/2004 | Kotzin |
| 2005/0002407 A1 | 1/2005 | Shaheen et al. |
| 2005/0021818 A1 | 1/2005 | Singhal et al. |
| 2005/0025299 A1 | 2/2005 | Tischer et al. |
| 2005/0025305 A1 | 2/2005 | Tischer et al. |
| 2005/0025308 A1 | 2/2005 | Tischer et al. |
| 2005/0032435 A1 | 2/2005 | Tischer et al. |
| 2005/0032549 A1 | 2/2005 | Kawaguchi |
| 2005/0037751 A1 | 2/2005 | Kim et al. |
| 2005/0043068 A1 | 2/2005 | Shohara et al. |
| 2005/0044229 A1 | 2/2005 | Brown et al. |
| 2005/0075093 A1 | 4/2005 | Lei et al. |
| 2005/0099959 A1 | 5/2005 | Standridge |
| 2005/0107109 A1 | 5/2005 | Gunaratnam et al. |
| 2005/0113045 A1 | 5/2005 | Santhoff et al. |
| 2005/0124319 A1 | 6/2005 | Williams et al. |
| 2005/0129224 A1 | 6/2005 | Piket et al. |
| 2005/0129225 A1 | 6/2005 | Piket et al. |
| 2005/0129226 A1 | 6/2005 | Piket et al. |
| 2005/0143016 A1 | 6/2005 | Becker et al. |
| 2005/0143017 A1 | 6/2005 | Lopp et al. |
| 2005/0143149 A1 | 6/2005 | Becker et al. |
| 2005/0143671 A1 | 6/2005 | Hastings et al. |
| 2005/0146431 A1 | 7/2005 | Hastings et al. |
| 2005/0147119 A1 | 7/2005 | Tofano |
| 2005/0148890 A1 | 7/2005 | Hastings |
| 2005/0151640 A1 | 7/2005 | Hastings |
| 2005/0180397 A1 | 8/2005 | Yeom |
| 2005/0191991 A1 | 9/2005 | Owen et al. |

(56) References Cited

U.S. PATENT DOCUMENTS

| | | | |
|---|---|---|---|
| 2005/0193131 A1 | 9/2005 | Bai et al. |
| 2005/0195855 A1 | 9/2005 | Buskirk et al. |
| 2005/0200492 A1 | 9/2005 | Woodward et al. |
| 2005/0202825 A1 | 9/2005 | Puranik et al. |
| 2005/0232284 A1 | 10/2005 | Karaoguz et al. |
| 2005/0238148 A1 | 10/2005 | Poustchi et al. |
| 2005/0240467 A1 | 10/2005 | Eckart et al. |
| 2005/0245241 A1 | 11/2005 | Durand et al. |
| 2005/0261970 A1 | 11/2005 | Vucina et al. |
| 2005/0271080 A1 | 12/2005 | Gorman |
| 2005/0282536 A1 | 12/2005 | McClure et al. |
| 2006/0059096 A1 | 3/2006 | Dublish et al. |
| 2006/0064750 A1 | 3/2006 | Kersey et al. |
| 2006/0078292 A1 | 4/2006 | Huang et al. |
| 2006/0121916 A1 | 6/2006 | Aborn et al. |
| 2006/0133414 A1 | 6/2006 | Luoma et al. |
| 2006/0143266 A1 | 6/2006 | Ohto et al. |
| 2006/0160571 A1 | 7/2006 | DePani et al. |
| 2006/0167985 A1 | 7/2006 | Albanese et al. |
| 2006/0187956 A1 | 8/2006 | Doviak et al. |
| 2006/0195554 A1 | 8/2006 | Payne et al. |
| 2006/0209745 A1 | 9/2006 | MacMullan et al. |
| 2006/0251115 A1 | 11/2006 | Haque et al. |
| 2007/0014307 A1 | 1/2007 | Srinivasan et al. |
| 2007/0017976 A1 | 1/2007 | Peyret et al. |
| 2007/0054660 A1 | 3/2007 | Cardina et al. |
| 2007/0088818 A1 | 4/2007 | Roberts et al. |
| 2007/0094279 A1 | 4/2007 | Mittal et al. |
| 2007/0121651 A1 | 5/2007 | Casey et al. |
| 2007/0127644 A1 | 6/2007 | Tischer et al. |
| 2007/0178900 A1 | 8/2007 | Frank |
| 2007/0206592 A1 | 9/2007 | Itakura et al. |
| 2007/0268922 A1 | 11/2007 | Dougan et al. |
| 2007/0291921 A1 | 12/2007 | Fleischer et al. |
| 2008/0020734 A1 | 1/2008 | Smith et al. |
| 2008/0192768 A1 | 8/2008 | Tischer et al. |
| 2008/0228600 A1 | 9/2008 | Treyz et al. |
| 2008/0301231 A1 | 12/2008 | Mehta et al. |
| 2008/0317063 A1 | 12/2008 | Enzmann et al. |
| 2011/0026436 A1* | 2/2011 | Karaoguz et al. ............. 370/254 |

FOREIGN PATENT DOCUMENTS

| | | |
|---|---|---|
| GB | 2 283 881 | 5/1995 |
| GB | 2 285 556 | 7/1995 |
| WO | WO 98/28929 | 7/1998 |
| WO | WO 01/58181 | 8/2001 |

OTHER PUBLICATIONS

AdvanceTec—AdvanceCommunicator®—Nokia Product Sheet; printed Jan. 2006, 1 page.
AdvanceTec—OEM Services; AdvanceTec—The Company; printed Jan. 2006, 1 page.
Bluetooth Enabled Technology; ELBT595; printed Jan. 2006, 1 page.
Cell Antenna—Introducing Celldock; Mar. 16, 2005, 1 page.
Merge by Cidco Communications—Merge for Motorola®; Design & Engineering Showcase Honors 2004; printed Jan. 2006, 2 pages.
Motorola SD 4505 System Expansion Cellular Phone Docking Station; page last updated Apr. 12, 2005; 1 page.
RCA 23200RE3—RCA Multi-Handset cell Docking System; Revised Jun. 6, 2005; 2 pages.
AdvanceTec, The AdvanceTec Solution, Cellular Hands-Free Solution: The Pro-Installed Hands Free, printed Jan. 2006, 4 pages.
CellAntenna Corporation: Cellular Antennas, accessories, cellphone products, www.cellantenna.com; CellAntenna Corporation; printed Sep. 26, 2002.
Cellsocket, Welcome to WHP Wireless, www.libretel.net/welcome.html; printed Aug. 17, 2005; 1 page.
CellSocket, www.cellantenna.com/Dockingstations/cellsocket.htm; Cell Antenna Corporation, printed Sep. 26, 2002.
Cellular Docking Station for Nokia Motorola Star Teac and Erickson Cellular Phones, www.cellantenna.com/Dockingstations/dockingstations.htm, CellAntenna Corporation, Sep. 26, 2002.
http://www.hometoys.com/news.php4?section=enchancedview&id=17792169; printed Aug. 17, 2005; 3 pages.
MercuryNews.com, Dock makes cell convenient at home, Jul. 25, 2005, www.timesleader.com/mld/timesleader/business/technology/12216277.htm, printed Aug. 17, 2005; 4 pages.
Motorola, SD4505—Cell phone dock module for SD4500 Series, printed Aug. 17, 2005, pp. 1-2.
PhoneLabs, PhoneLabs Products, printed Aug. 17, 2005, pp. 1-2.
RCA Communications, RCA Cell Docking System 23200RE3, printed Aug. 17, 2005, pp. 1-2.
RCA, Innovative RCA Cell Docking System Allows cell Users to Make and Receive Calls Through a Home Phone, printed Aug. 17, 2005, pp. 1-3.
Telular Corporation—2004 Annual Report, Making Wireline Replacement a Reality, 2004, 76 pages.
Thomson Group, Annual Report, Jun. 3, 2005, pp. 1-180.
Thomson Group, Index to Consolidated Financial Statement, Jun. 3, 2005, F1-F7, 150 pages total.
VOX2 Cellphone Base Station Model No. 131, Vox.Link User Guide, Rev. 1.02., printed Jan. 2006, 1 page.
VOX2 Voxlink Cellphone Docking Station, www.cellantenna.com/Dockingstations/VOX2dockingstation.htm; CellAntenna Corporation, printed Sep. 26, 2002.
U.S. Official Action dated Nov. 9, 2000 in U.S. Appl. No. 09/126,268.
U.S. Official Action dated Jul. 5, 2001 in U.S. Appl. No. 09/126,268.
U.S. Official Action dated Oct. 25, 2000 in U.S. Appl. No. 09/268,591.
U.S. Official Action dated May 1, 2001 in U.S. Appl. No. 09/268,591.
U.S. Official Action dated Jul. 7, 2004 in U.S. Appl. No. 09/999,806.
U.S. Official Action dated Nov. 30, 2005 in U.S. Appl. No. 09/999,806.
U.S. Official Action dated Sep. 23, 2004 in U.S. Appl. No. 10/195,197.
U.S. Official Action dated May 25, 2005 in U.S. Appl. No. 10/195,197.
U.S. Official Action dated Dec. 16, 2005 in U.S. Appl. No. 10/195,197.
U.S. Official Action dated Apr. 28, 2006 in U.S. Appl. No. 10/195,197.
U.S. Notice of Allowance / Allowability dated Jan. 4, 2007 in U.S. Appl. No. 10/195,197.
U.S. Official Action dated Jan. 28, 2004 in U.S. Appl. No. 10/036,206.
U.S. Official Action dated Jul. 19, 2004 in U.S. Appl. No. 10/036,206.
U.S. Official Action dated May 5, 2005 in U.S. Appl. No. 10/036,206.
U.S. Official Action dated Dec. 23, 2005 in U.S. Appl. No. 10/036,206.
U.S. Official Action dated Aug. 15, 2003 in U.S. Appl. No. 10/055,212.
U.S. Official Action dated Mar. 6, 2008 in U.S. Appl. No. 10/929,317.
U.S. Official Action dated Dec. 9, 2008 in U.S. Appl. No. 10/929,317.
U.S. Official Action dated Apr. 26, 2006 in U.S. Appl. No. 10/929,711.
U.S. Notice of Allowance / Allowability dated Oct. 30, 2006 in U.S. Appl. No. 10/929,711.
U.S. Official Action dated Mar. 6, 2008 in U.S. Appl. No. 10/929,712.
U.S. Notice of Allowance / Allowability dated Dec. 15, 2008 in U.S. Appl. No. 10/929,712.
U.S. Official Action dated Mar. 5, 2008 in U.S. Appl. No. 10/929,715.
U.S. Official Action dated Jun. 19, 2008 in U.S. Appl. No. 10/929,715.
U.S. Official Action dated Apr. 13, 2009 in U.S. Appl. No. 10/929,715.
U.S. Official Action dated Nov. 30, 2005 in U.S. Appl. No. 11/048,132.
U.S. Official Action dated Jun. 20, 2006 in U.S. Appl. No. 11/048,132.
U.S. Official Action dated Apr. 11, 2007 in U.S. Appl. No. 11/322,532.
U.S. Official Action dated Oct. 7, 2008 in U.S. Appl. No. 11/323,180.
U.S. Official Action dated May 12, 2009 in U.S. Appl. No. 11/323,180.

(56) References Cited

OTHER PUBLICATIONS

U.S. Official Action dated Jan. 23, 2008 in U.S. Appl. No. 11/323,181.
U.S. Official Action dated Sep. 30, 2008 in U.S. Appl. No. 11/323,181.
U.S. Official Action dated Feb. 19, 2009 in U.S. Appl. No. 11/323,181.
U.S. Official Action dated Jan. 16, 2009 in U.S. Appl. No. 11/323,182.
U.S. Official Action dated Jul. 20, 2009 in U.S. Appl. No. 11/323,182.
U.S. Official Action dated Oct. 30, 2008 in U.S. Appl. No. 11/323,185.
U.S. Official Action dated May 18, 2009 in U.S. Appl. No. 11/323,185.
U.S. Official Action dated Oct. 15, 2008 in U.S. Appl. No. 11/323,186.
U.S. Official Action dated May 12, 2009 in U.S. Appl. No. 11/323,186.
U.S. Official Action dated Jan. 21, 2009 in U.S. Appl. No. 11/323,818.
U.S. Official Action dated Mar. 14, 2008 in U.S. Appl. No. 11/323,820.
U.S. Official Action dated Nov. 17, 2008 in U.S. Appl. No. 11/323,820.
U.S. Official Action dated Apr. 22, 2009 in U.S. Appl. No. 11/323,820.
U.S. Official Action dated Mar. 17, 2008 in U.S. Appl. No. 11/324,033.
U.S. Official Action dated Dec. 23, 2008 in U.S. Appl. No. 11/324,033.
U.S. Official Action dated Jun. 2, 2009 in U.S. Appl. No. 11/324,033.
U.S. Official Action dated Mar. 28, 2008 in U.S. Appl. No. 11/324,034.
U.S. Official Action dated Oct. 3, 2008 in U.S. Appl. No. 11/324,034.
U.S. Official Action dated Apr. 14, 2009 in U.S. Appl. No. 11/324,034.
U.S. Official Action dated Feb. 5, 2009 in U.S. Appl. No. 11/324,149.
U.S. Official Action dated Jul. 22, 2009 in U.S. Appl. No. 11/324,149.
U.S. Official Action dated Mar. 11, 2008 in U.S. Appl. No. 11/324,154.
U.S. Official Action dated Dec. 30, 2008 in U.S. Appl. No. 11/324,154.
U.S. Official Action dated Jul. 9, 2009 in U.S. Appl. No. 11/324,154.
U.S. Official Action dated Jul. 6, 2007 in U.S. Appl. No. 11/637,264.
U.S. Official Action dated Apr. 8, 2008 in U.S. Appl. No. 11/637,264.
U.S. Official Action dated May 13, 2009 in U.S. Appl. No. 11/637,264.
U.S. Notice of Allowance / Allowability dated Jun. 21, 2002 in U.S. Appl. No. 09/126,268.
U.S. Notice of Allowance / Allowability dated Oct. 23, 2001 in U.S. Appl. No. 09/268,591.
U.S. Notice of Allowance / Allowability dated Mar. 23, 2005 in U.S. Appl. No. 09/999,806.
U.S. Notice of Allowance / Allowability dated Apr. 5, 2006 in U.S. Appl. No. 09/999,806.
U.S. Notice of Allowance / Allowability dated Aug. 7, 2006 in U.S. Appl. No. 09/999,806.
U.S. Notice of Allowance / Allowability dated Jan. 4, 2005 in U.S. Appl. No.. 10/036,206.
U.S. Notice of Allowance / Allowability dated Sep. 7, 2005 in U.S. Appl. No. 10/036,206.
U.S. Notice of Allowance / Allowability dated Apr. 6, 2006 in U.S. Appl. No. 10/036,206.
U.S. Notice of Allowance / Allowability dated Feb. 24, 2004 in U.S. Appl. No. 10/055,212.
U.S. Notice of Allowance / Allowability dated Jul. 3, 2006 in U.S. Appl. No. 10/851,932.
U.S. Notice of Allowance / Allowability dated Aug. 6, 2009 in U.S. Appl. No. 10/929,317.
U.S. Notice of Allowance / Allowability dated Sep. 23, 2009 in U.S. Appl. No. 10/929,715.
U.S. Notice of Allowance / Allowability dated Feb. 23, 2007 in U.S. Appl. No. 11/048,132.
U.S. Notice of Allowance / Allowability dated Jul. 26, 2007 in U.S. Appl. No. 11/322,532.
U.S. Notice of Allowance / Allowability dated Oct. 23, 2007 in U.S. Appl. No. 11/322,532.
U.S. Official Action dated Oct. 1, 2009 in U.S. Appl. No. 11/323,180.
U.S. Official Action dated May 13, 2010 in U.S. Appl. No. 11/323,180.
U.S. Official Action dated Aug. 20, 2009 in U.S. Appl. No. 11/323,181.
U.S. Official Action dated Oct. 23, 2009 in U.S. Appl. No. 11/323,185.
U.S. Official Action dated Jun. 3, 2010 in U.S. Appl. No. 11/323,185.
U.S. Official Action dated Oct. 1, 2009 in U.S. Appl. No. 11/323,186.
U.S. Official Action dated Sep. 11, 2009 in U.S. Appl. No. 11/323,818.
U.S. Official Action dated Nov. 10, 2009 in U.S. Appl. No. 11/323,820.
U.S. Notice of Allowance / Allowability dated Apr. 16, 2010 in U.S. Appl. No. 11/323,820.
U.S. Official Action dated Apr. 1, 2008 in U.S. Appl. No. 11/323,825.
U.S. Official Action dated Sep. 16, 2008 in U.S. Appl. No. 11/323,825.
U.S. Official Action dated Mar. 5, 2009 in U.S. Appl. No. 11/323,825.
U.S. Official Action dated Jun. 23, 2009 in U.S. Appl. No. 11/323,825.
U.S. Official Action dated Dec. 16, 2009 in U.S. Appl. No. 11/323,825.
U.S. Notice of Allowance / Allowability dated Sep. 18, 2009 in U.S. Appl. No. 11/324,033.
U.S. Official Action dated Nov. 30, 2009 in U.S. Appl. No. 11/324,034.
U.S. Official Action dated Jul. 7, 2010 in U.S. Appl. No. 11/323,034.
U.S. Official Action dated Oct. 5, 2009 in U.S. Appl. No. 11/324,154.
U.S. Official Action dated May 11, 2010 in U.S. Appl. No. 11/324,154.
U.S. Official Action dated Sep. 18, 2008 in U.S. Appl. No. 11/637,264.
U.S. Official Action dated Sep. 30, 2009 in U.S. Appl. No. 11/637,264.
U.S. Official Action dated Oct. 15, 2009 in U.S. Appl. No. 11/733,525.
U.S. Official Action dated Apr. 16, 2010 in U.S. Appl. No. 11/733,525.
U.S. Official Action dated Jul. 7, 2010 in U.S. Appl. No. 12/639,448.
U.S. Official Action dated Jul. 21, 2010 in U.S. Appl. No. 11/323,186.
U.S. Official Action dated Sep. 29, 2010 in U.S. Appl. No. 11/637,264.
U.S. Official Action dated Sep. 30, 2010 in U.S. Appl. No. 12/874,450.
U.S. Official Action dated Oct. 14, 2010 in U.S. Appl. No. 12/642,288.
U.S. Official Action dated Oct. 29, 2010 in U.S. Appl. No. 12/640,073.
U.S. Official Action dated Nov. 22, 2010 in U.S. Appl. No. 12/639,313.
Notice of Allowance/Allowability dated Dec. 23, 2010, in U.S. Appl. No. 12/837,785.
U.S. Official Action dated Jan. 19, 2011 in U.S. Appl. No. 11/324,034.
U.S. Final Official Action dated Oct. 27, 2010 in U.S. Appl. No. 11/733;525.
U.S. Final Official Action dated Feb. 4, 2011 in U.S. Appl. No. 12/639,448.
U.S. Notice of Allowance dated Mar. 8, 2011 in U.S. Appl. No. 12/639,313.
U.S. Notice of Allowance dated Dec. 27, 2010 in U.S. Appl. No. 11/637,264.
U.S. Official Action dated Feb. 7, 2011 in U.S. Appl. No. 11/952,510.

(56) References Cited

OTHER PUBLICATIONS

U.S. Final Official Action dated Mar. 11, 2011 in U.S. Appl. No. 12/640,073.
U.S. Official Action dated Mar. 21, 2011 in U.S. Appl. No. 12/642,288.
U.S. Notice of Allowance dated Apr. 15, 2011 in U.S. Appl. No. 11/637,264.
U.S. Notice of Allowance dated Apr. 14, 2011 in U.S. Appl. No. 12/639,313.
U.S. Notice of Allowance dated Mar. 29, 2011 in U.S. Appl. No. 12/837,785.
U.S. Official Action dated Apr. 13, 2011 in U.S. Appl. No. 12/874,450.
U.S. Notice of Allowance dated May 17, 2011 in U.S. Appl. No. 12/639,448.
U.S. Official Action dated Jun. 17, 2011 in U.S. Appl. No. 12/642,288.
U.S. Official Action dated Aug. 19, 2011 in U.S. Appl. No. 12/909,145.
U.S. Official Action dated Sep. 14, 2011 in U.S. Appl. No. 11/952,510.
U.S. Notice of Allowance dated Nov. 14, 2011 in U.S. Appl. No. 12/642,288.
U.S. Office Action dated Jan. 30, 2012 in U.S. Appl. No. 11/952,510.
U.S. Office Action dated Feb. 3, 2012 in U.S. Appl. No. 12/909,145.
U.S. Office Action dated May 4, 2012 in U.S. Appl. No. 13/089,577.
U.S. Office Action dated May 22, 2012 in U.S. Appl. No. 12/874,450.
U.S. Office Action dated Jun. 11, 2012 in U.S. Appl. No. 12/909,145.
U.S. Office Action dated Dec. 5, 2012 in U.S. Appl. No. 12/952,510.
U.S. Office Action dated Oct. 11, 2012 in U.S. Appl. No. 12/854,475.
U.S. Office Action dated Nov. 14, 2012 in U.S. Appl. No. 12/874,450.
U.S. Office Action dated Nov. 21, 2012 in U.S. Appl. No. 12/909,145.
U.S. Office Action dated Sep. 14, 2010 in U.S. Appl. No. 12/759,767.
U.S. Office Action dated Mar. 2, 2011 in U.S. Appl. No. 12/759,767.
U.S. Office Action dated Jun. 26, 2012 in U.S. Appl. No. 12/759,767.
U.S. Notice of Allowance dated Nov. 16, 2012 in U.S. Appl. No. 12/759,767.
U.S. Notice of Allowance dated Apr. 24, 2013 in U.S. Appl. No. 12/639,448.
U.S. Notice of Allowance dated Apr. 16, 2013 in U.S. Appl. No. 12/874,450.
U.S. Notice of Allowance dated Apr. 24, 2013 in U.S. Appl. No. 12/909,145.
U.S. Notice of Allowance dated Jun. 26, 2013 in U.S. Appl. No. 11/952,510.
U.S. Notice of Allowance dated May 9, 2013 in U.S. Appl. No. 12/854,475.

* cited by examiner

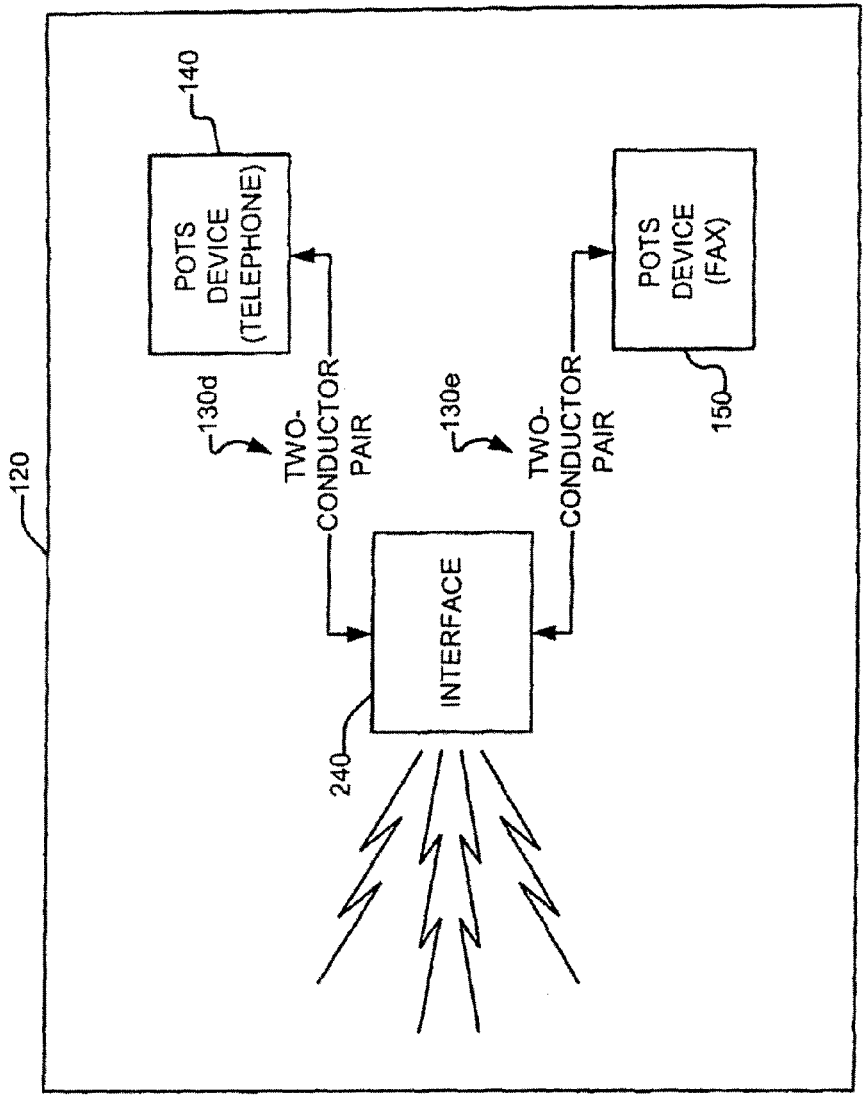
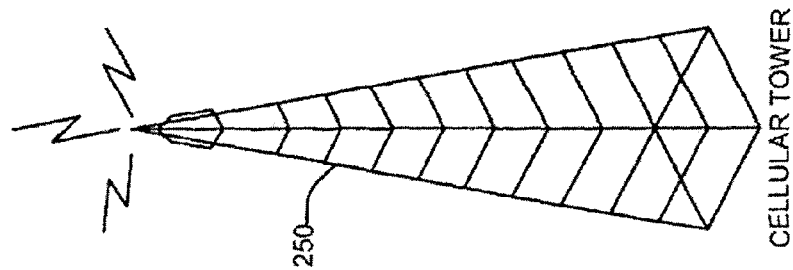
FIG. 2

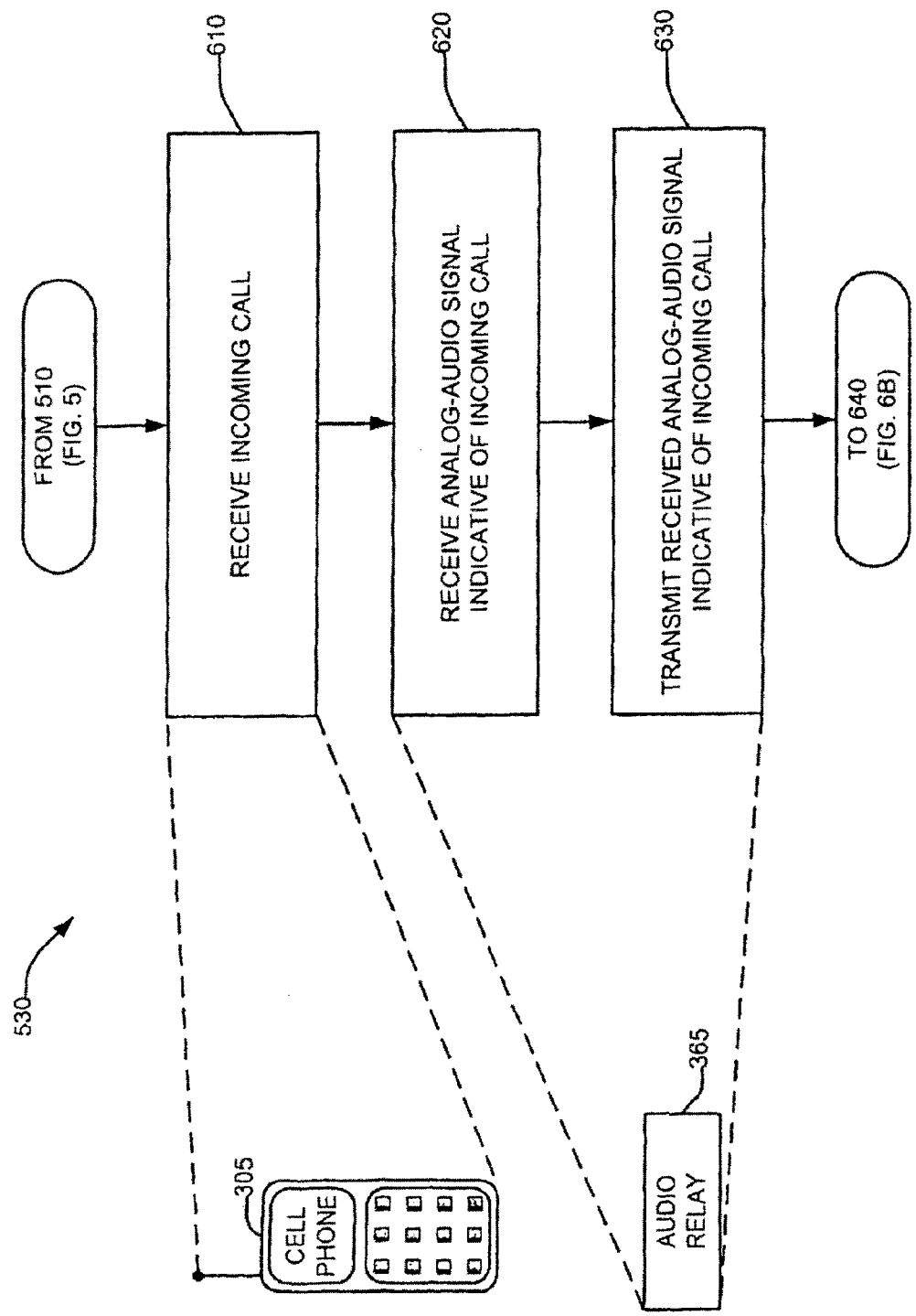

APPARATUS AND METHOD FOR PROVIDING A USER INTERFACE FOR FACILITATING COMMUNICATIONS BETWEEN DEVICES

CROSS REFERENCE TO RELATED APPLICATIONS

This patent application is a Continuation of co-pending U.S. patent application Ser. No. 12/759,767, entitled "Apparatus and Method for Providing a User Interface for Facilitating Communications Between Devices," filed Apr. 14, 2010, which is a Continuation of U.S. patent application Ser. No. 11/323,825, now abandoned, filed Dec. 30, 2005, entitled "Apparatus and Method for Providing a User Interface for Facilitating Communications Between Devices," which is a Continuation-In-Part patent application of U.S. Pat. No. 7,194,083, entitled "System and Method for Interfacing Plain Old Telephone System (POTS) Devices with Cellular Networks," filed on Jul. 15, 2002. Each of the U.S. patent applications and U.S. patents listed in this section is herein incorporated by reference in its entirety.

This patent application is related to the following co-pending U.S. patent applications: U.S. Pat. No. 7,623,654, entitled "Systems and Methods for Interfacing Telephony Devices with Cellular and Computer Networks," filed on Aug. 30, 2004; U.S. Pat. No. 7,522,722, entitled "System and Method for Interfacing Plain Old Telephone System (POTS) Devices with Cellular Devices in Communication with a Cellular Network," filed on Aug. 30, 2004; U.S. Pat. No. 7,200,424, entitled "Systems and Methods for Restricting the Use and Movement of Telephony Devices," filed on Aug. 30, 2004; U.S. Pat. No. 7,623,653, entitled "Systems and Methods for Passing Through Alternative Network Device Features to Plain Old Telephone System (POTS) Devices," filed on Aug. 30, 2004; U.S. Pat. No. 7,363,034, entitled "Cellular Docking Station," filed on Dec. 30, 2005; U.S. patent application Ser. No. 11/323,180, now abandoned, entitled "Apparatus, Method, and Computer-Readable Medium for Interfacing Communications Devices," filed on Dec. 30, 2005; U.S. patent application Ser. No. 11/323,820, now abandoned, entitled "Apparatus, Method, and Computer-Readable Medium for Interfacing Devices with Communications Networks," filed on Dec. 30, 2005; U.S. patent application Ser. No. 11/323,181, now abandoned, entitled "Apparatus, Method, and Computer-Readable Medium for Securely Providing Communications Between Devices and Networks," filed on Dec. 30, 2005; U.S. patent application Ser. No. 11/324,034, now abandoned, entitled "Plurality of Interface Devices for Facilitating Communications Between Devices and Communications Networks," filed on Dec. 30, 2005; U.S. patent application Ser. No. 11/323,182, now abandoned, entitled "Apparatus and Method for Providing Communications and Connection-Oriented Services to Devices," filed on Dec. 30, 2005; U.S. patent application Ser. No. 11/323,185, now abandoned, entitled "Apparatus and Method for Prioritizing Communications Between Devices," filed on Dec. 30, 2005; U.S. patent application Ser. No. 11/324,149, now abandoned, entitled "Apparatus, Method, and Computer-Readable Medium for Communication Between and Controlling Network Devices," filed on Dec. 30, 2005; U.S. patent application Ser. No. 11/323,186, now abandoned, entitled "Apparatus and Method for Aggregating and Accessing Data According to User Information," filed on Dec. 30, 2005; U.S. patent application Ser. No. 11/324,033, now abandoned, entitled "Apparatus and Method for Restricting Access to Data," filed on Dec. 30, 2005; U.S. patent application Ser. No. 11/323,818, now abandoned, entitled "Apparatus and Method for Providing Emergency and Alarm Communications," filed on Dec. 30, 2005; and U.S. patent application Ser. No. 11/324,154, now abandoned, entitled "Apparatus and Method for Testing Communication Capabilities of Networks and Devices," filed on Dec. 30, 2005. Each of the U.S. patent applications and U.S. patents listed in this section is herein incorporated by reference in its entirety.

TECHNICAL FIELD

The exemplary embodiments relate generally to telecommunications and, more particularly, to an apparatus and method for providing a user interface for facilitating communications between devices.

BACKGROUND

Emerging communications network protocols and solutions, such as Voice over Internet Protocol (VoIP) and WI-FI, allow individuals to use VoIP and WI-FI compatible devices to communicate with each other over wide area networks, such as the Internet, in the same manner in which they currently communicate over the Public Switched Telecommunications Network (PSTN). However, in most instances, owners of legacy devices such as cellular telephones and Plain Old Telephone System (POTS) devices which are compatible with cellular networks and the PSTN are not capable of interfacing these devices to networks associated with the emerging communications network protocol and solutions. Thus, legacy device owners are inconvenienced by having multiple devices that lack functionality with the emerging communications network protocols and solutions. Owners of legacy devices cannot convert data sent via the emerging communications network protocols and solutions to formats compatible with the legacy devices. Moreover, users cannot interact with the legacy devices to dictate which devices should receive data and in what format the devices should receive the data.

SUMMARY

In accordance with exemplary embodiments, the above and other problems are solved by providing an apparatus and method for providing a user interface for facilitating communications between a first device and a second device. According to one aspect, an interface device provides communications between a first device and a second device. The interface device has an input for receiving data in a first format from the first device. Logic within the interface device is configured to receive a request to interact with the interface device and to provide a user interface in response to receiving the request. The logic identifies a second device for receiving the data from the first device. The logic identifies a second format that is compatible with the second device and translates the data to the second format. The interface device further has an output for transmitting the translated data to the second device.

According to various aspects, the user interface is selected based upon whether the request is received via a user input interface or a network interface. A user input interface may include a mouse interface, a touchpad interface, a motion sensor interface, or a touchscreen interface. A network interface may include a computer interface or a cellular telephone interface.

According to another aspect, an interface device provides communications between a first device and a second device. The interface device has logic configured to determine whether the first device is present, and if so, to identify the second device for receiving the data and to provide power to the second device. The interface device has an input for receiving data in a first format from the first device. The logic identifies a second format that is compatible with the second device and translates the data to the second format. The interface device has an output for transmitting the translated data to the second device.

According to yet another aspect, a method provides communications between a first device and a second device. The method includes receiving a request to interact with an interface device, and in response, providing a user interface. Data is received, at the interface device, in a first format from the first device. The second device for receiving the data is identified, as well as a second format compatible with the second device. The data is translated to the second format. In an embodiment, the translated data is transmitted to the second device The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the exemplary embodiments, will be apparent from a reading of the following detailed description and a review of the associated drawings.

BRIEF DESCRIPTION OF THE DRAWINGS

Many aspects of the exemplary embodiments can be better understood with reference to the following drawings. The components in the drawings are not necessarily to scale, emphasis instead being placed upon clearly illustrating the principles of the embodiments. Moreover, in the drawings, like reference numerals designate corresponding parts throughout the several views.

FIG. 2 is a block diagram showing one illustrative embodiment of the system for interfacing POTS devices with cellular networks;

FIGS. 6A and 6B are flowcharts showing one illustrative embodiment of the method associated with the conversion of cellular network compatible signals to POTS compatible signals;

DETAILED DESCRIPTION

Reference will now be made in detail to the description. While several illustrative embodiments will be described in connection with these drawings, there is no intent to limit it to the illustrative embodiment or illustrative embodiments disclosed therein. On the contrary, the intent is to cover all alternatives, modifications, and equivalents included within the spirit and scope of the embodiments as defined by the claims.

Figure 1:
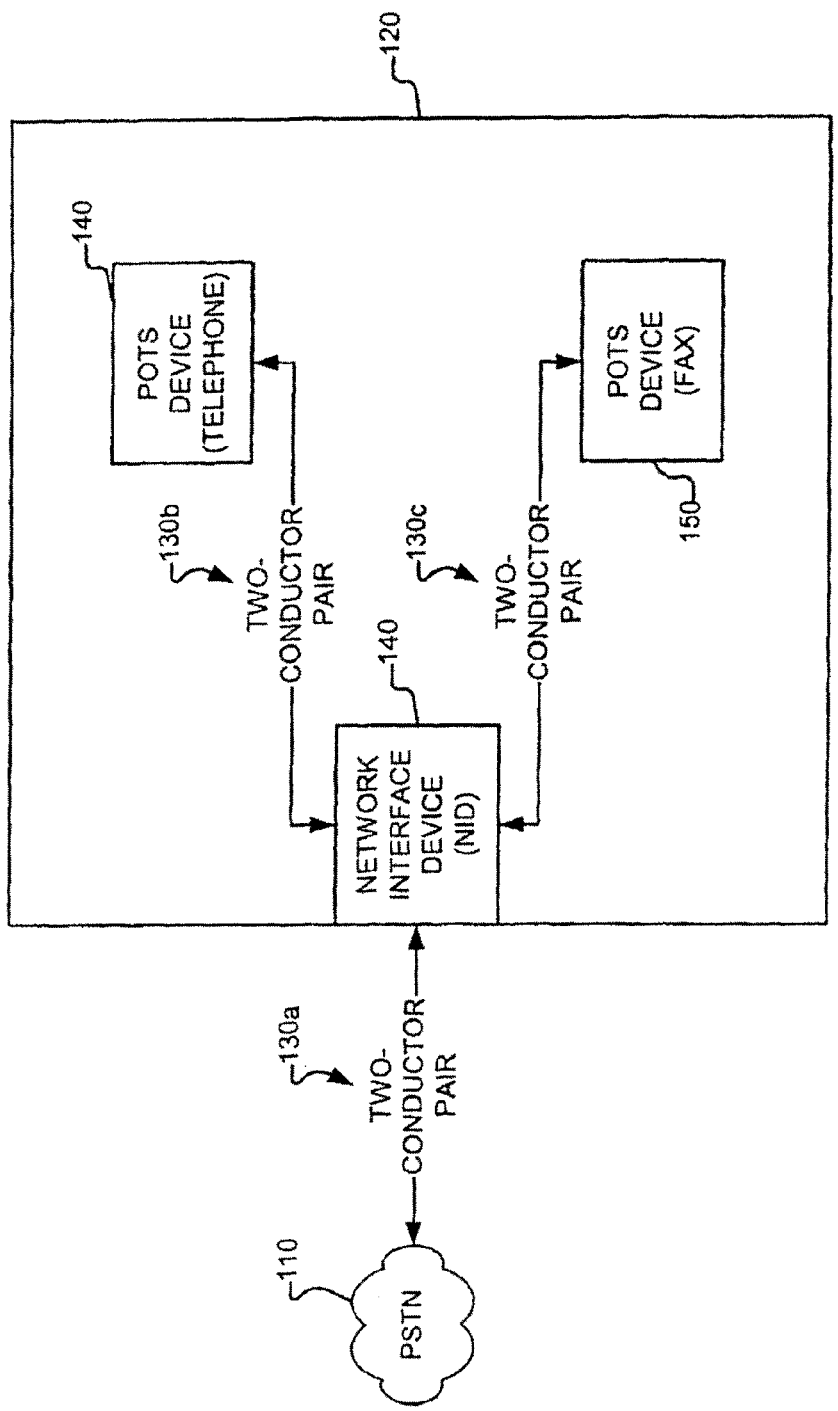
FIG. 1 is a block diagram showing a conventional POTS connection to a telephone company through a network interface device.

FIG. 1 is a block diagram showing a conventional POTS connection to a PSTN 110 through a Network Interface Device (NID) 160. Since such connections are well known, only a cursory discussion is presented here. As shown in FIG. 1, several POTS devices 140, 150 occupy a location 120 (e.g., home, business, etc.). Each POTS device 140, 150 is connected to the NID 160 by two-conductor pair wires 130b, 130c, also known as POTS pairs, or twisted pairs. The NID 160 serves as the interface between the POTS devices 140, 150 and the PSTN 110, wherein the NID 160 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface device 240, thereby permitting connection between the POTS devices 140, 150 and a cellular network. In this sense, the POTS devices 140, 150 are connected to the interface device 240, rather than an NID 160 (FIG. 1), by two-conductor pair wires 130d, 130e. Since the interface device 240 is a bridge between the POTS devices 140, 150 and the cellular network, the interface device 240 is configured to receive POTS compatible signals from the POTS devices 140, 150 and convert the POTS compatible signals to cellular network compatible signals, which are transmitted from the interface device 240 to the cellular tower 250. Additionally, the interface device 240 is configured to receive cellular network compatible signals from the cellular tower 250 and convert the cellular network compatible signals to POTS compatible signals, which are then forwarded to the POTS devices 140, 150 for use within the location 120. While a specific PSTN network is not shown in FIG. 2, it will be clear to one of ordinary skill in the art that the cellular tower 250 may be connected to a PSTN network, thereby permitting communication with other PSTN devices.

Figure 3:
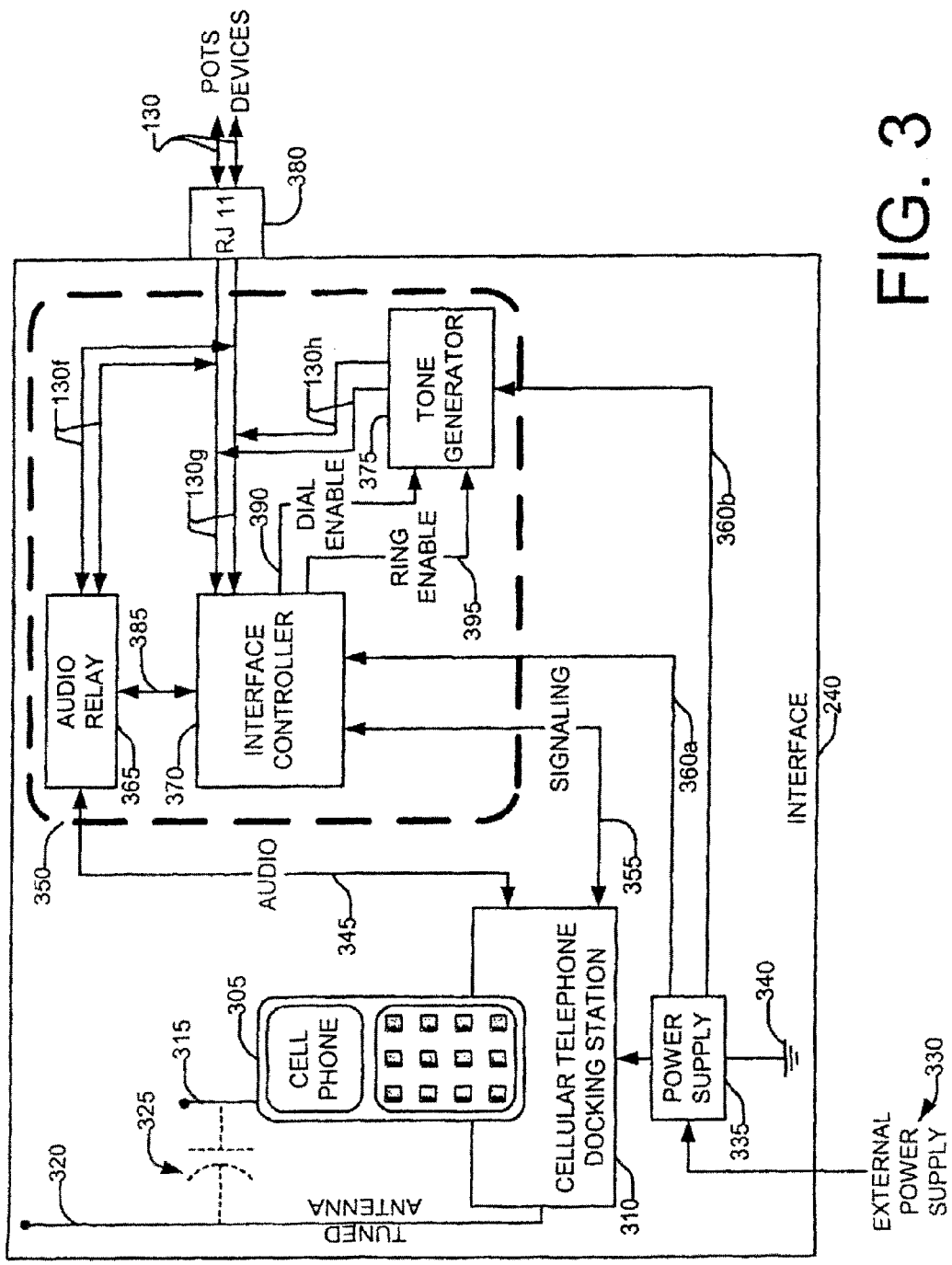
FIG. 3 is a block diagram showing one illustrative embodiment of the interface of FIG. 2.

FIG. 3 is a block diagram showing, in greater detail, a preferred illustrative embodiment of the interface device 240 of FIG. 2. In the preferred illustrative embodiment, the cellular network compatible signals are transmitted and received at the interface device 240 by a cellular telephone 305 while the POTS compatible signals are transmitted and received at the interface device 240 through a POTS interface 380, such as an RJ11 interface 380. Thus, in the preferred illustrative embodiment, the interface device 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional interfaces (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number.

The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 310 may modify the signaling data on signaling line 355 appropriately (e.g., amplify, attenuate, reformat, etc.), or, alternatively, the cellular phone docking station 310 may relay the signaling data on signaling line 355 without modification. Regardless of whether or not the signaling data on signaling line 355 is modified, several aspects of the conveyed signal are discussed below, in greater detail, with reference to other components 350 associated with the interface device 240. Although the term line is used to describe various non-limiting embodiments, one skilled in the art will be aware that in some embodiments a line carrying signals may be a path on a separate communication media from other signals while the line carrying signals in other embodiments may be a path on a communications media into which many different signals are multiplexed using various multiplexing techniques known to one of ordinary skill in the art. Furthermore, in other embodiments, the signals may be carried by wireless communication media.

In addition to the cellular phone docking station 310, the interface device 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS interface (e.g., RJ11 interface) 380. Similarly, for outgoing analog-audio signals 345 (i.e., audio from the POTS devices 140, 150 (FIG. 2) to the cellular telephone 305), the analog audio signals 345 are received by the audio relay 365 through the POTS interface 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS interface 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface device 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface device 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data 355, therefore, instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS interface 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS interface 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
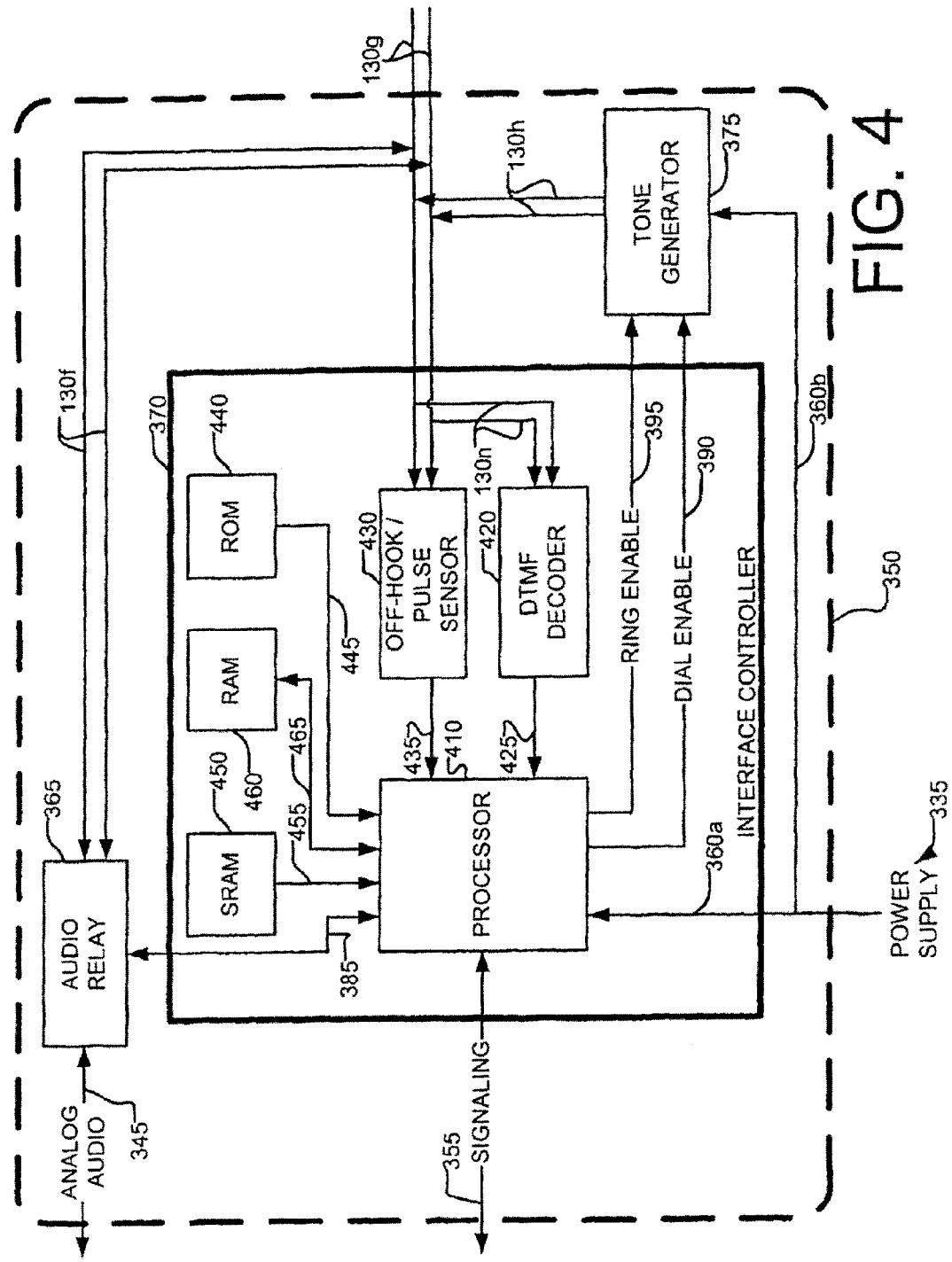
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, Random-Access Memory (RAM) 460, Read-Only Memory (ROM) 440, Static-Random-Access Memory (SRAM) 450, an off-hook/pulse sensor 430, and a Dual-Tone Multi-Frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS interface 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface device 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

Figure 5:
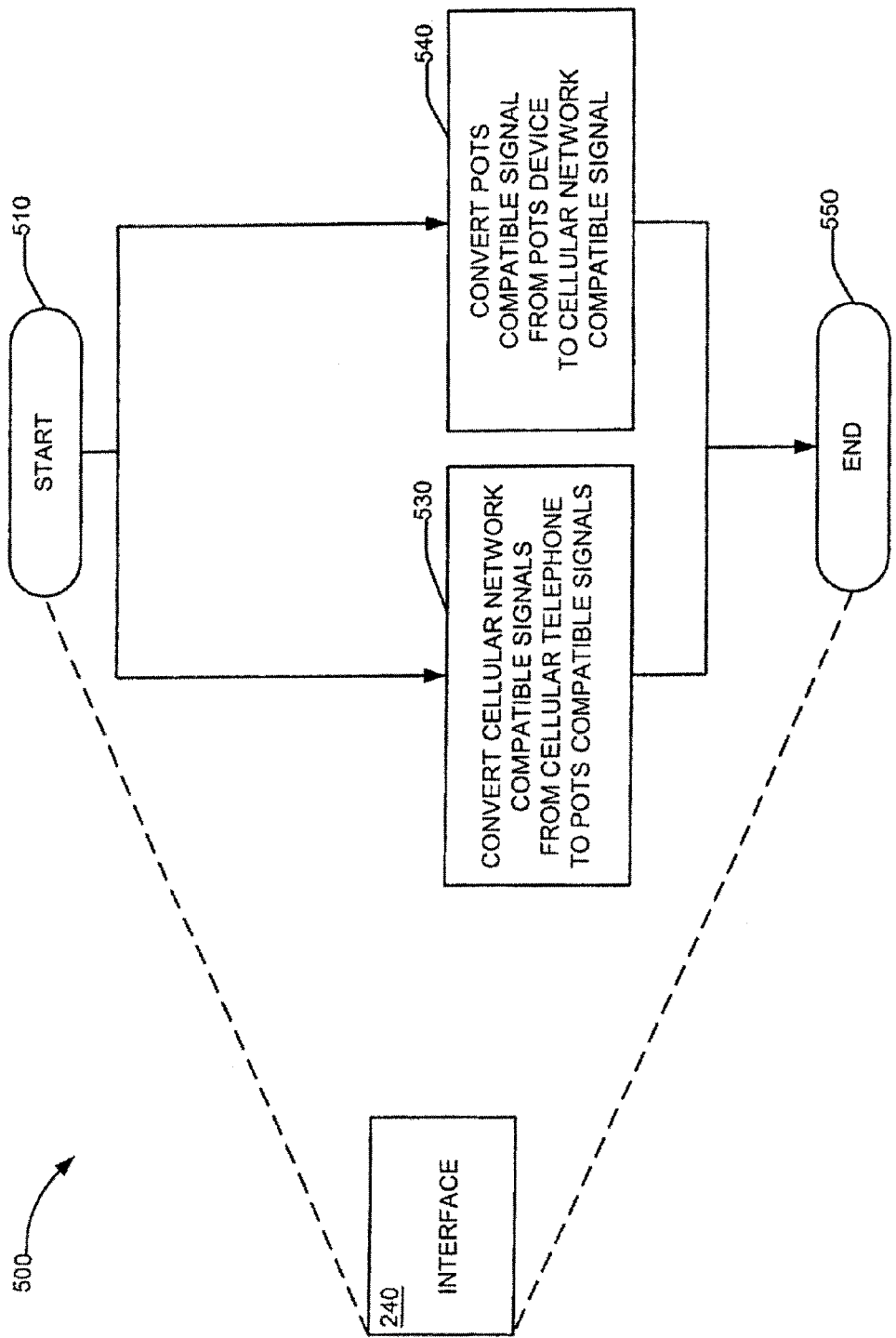
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface device 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface device 240.

Figure 6B:
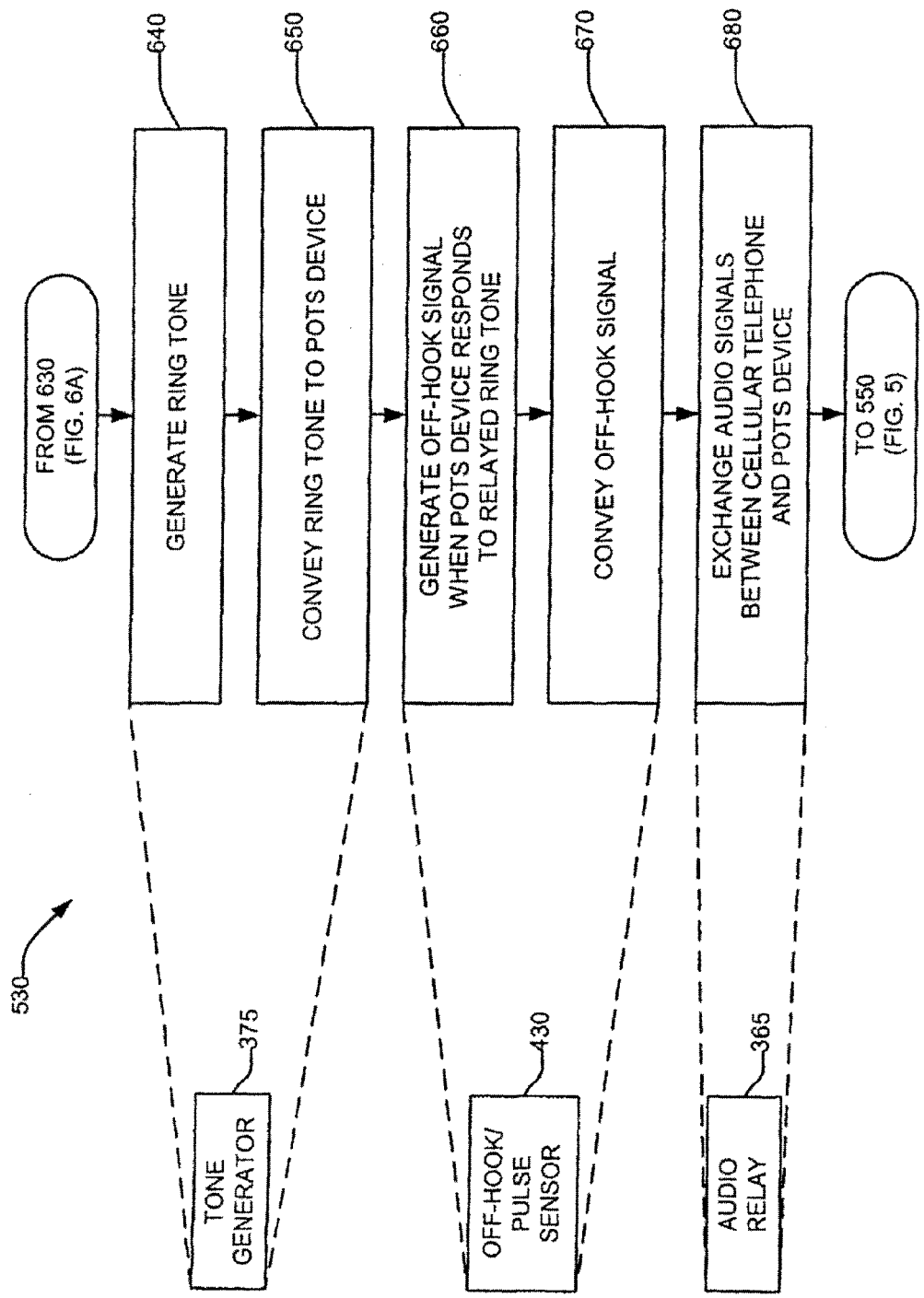

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
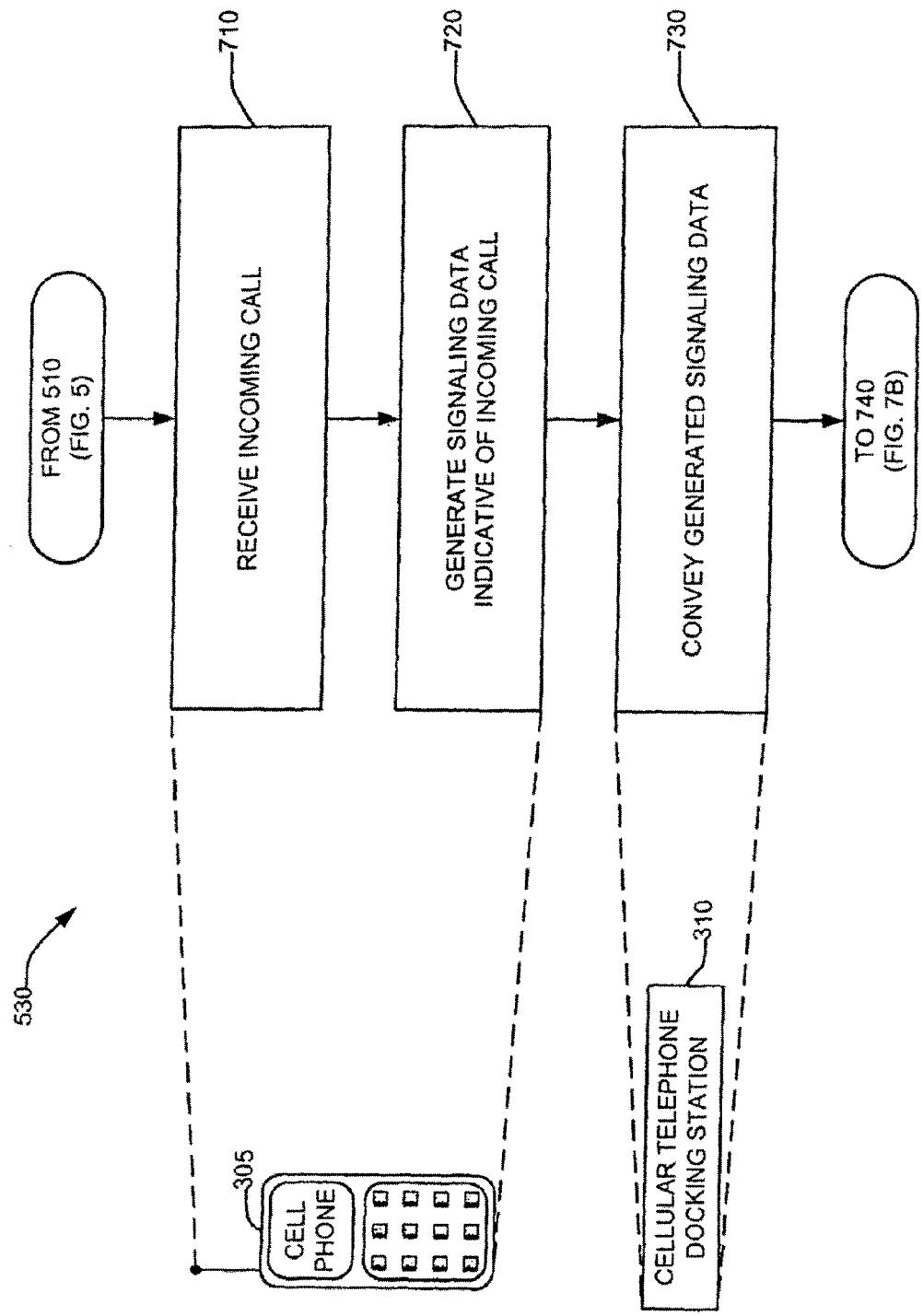
FIGS. 7A and 7B are flowcharts showing another illustrative embodiment of the method associated with the conversion of cellular network compatible signals to POTS compatible signals.
Figure 7B:
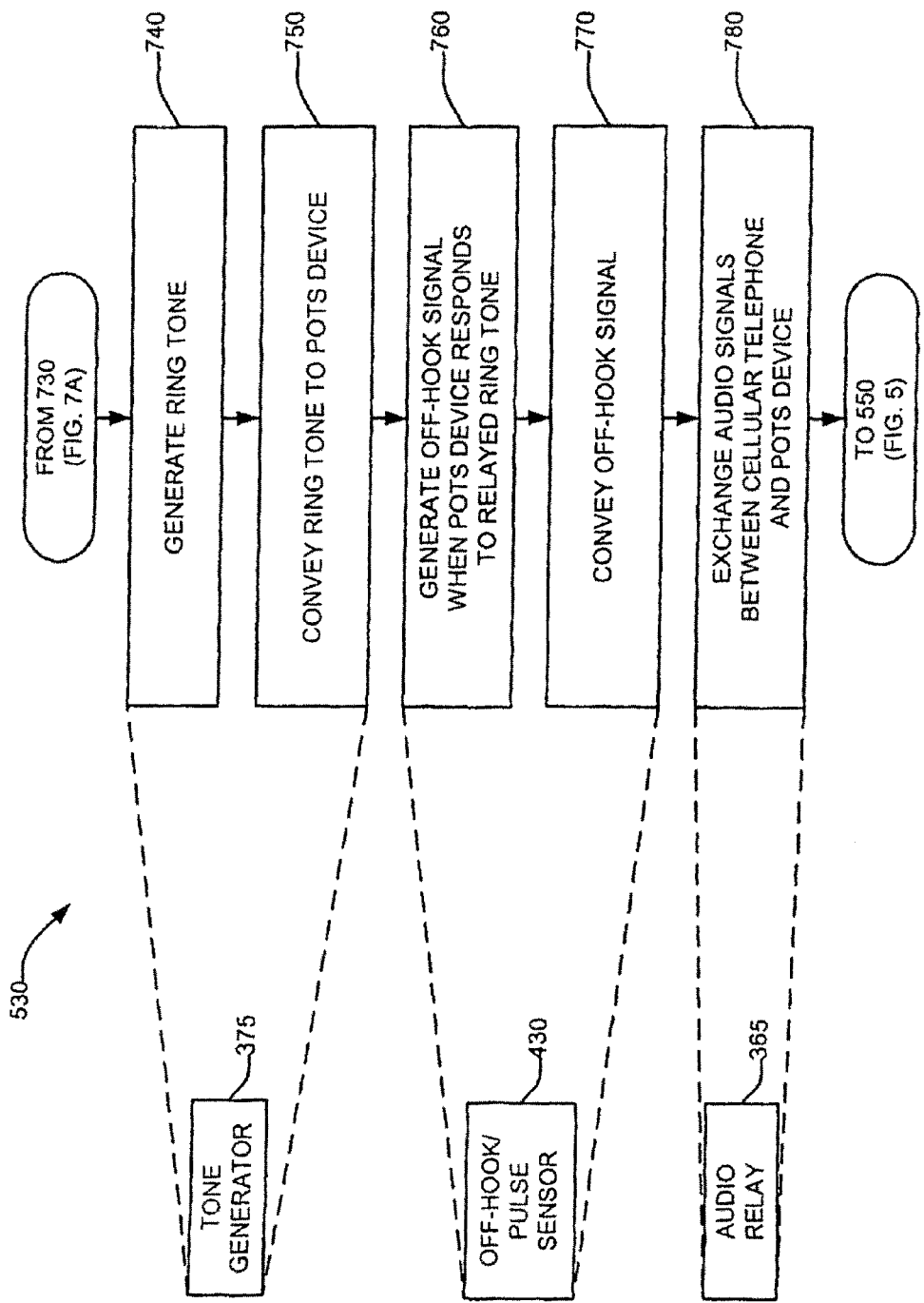

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
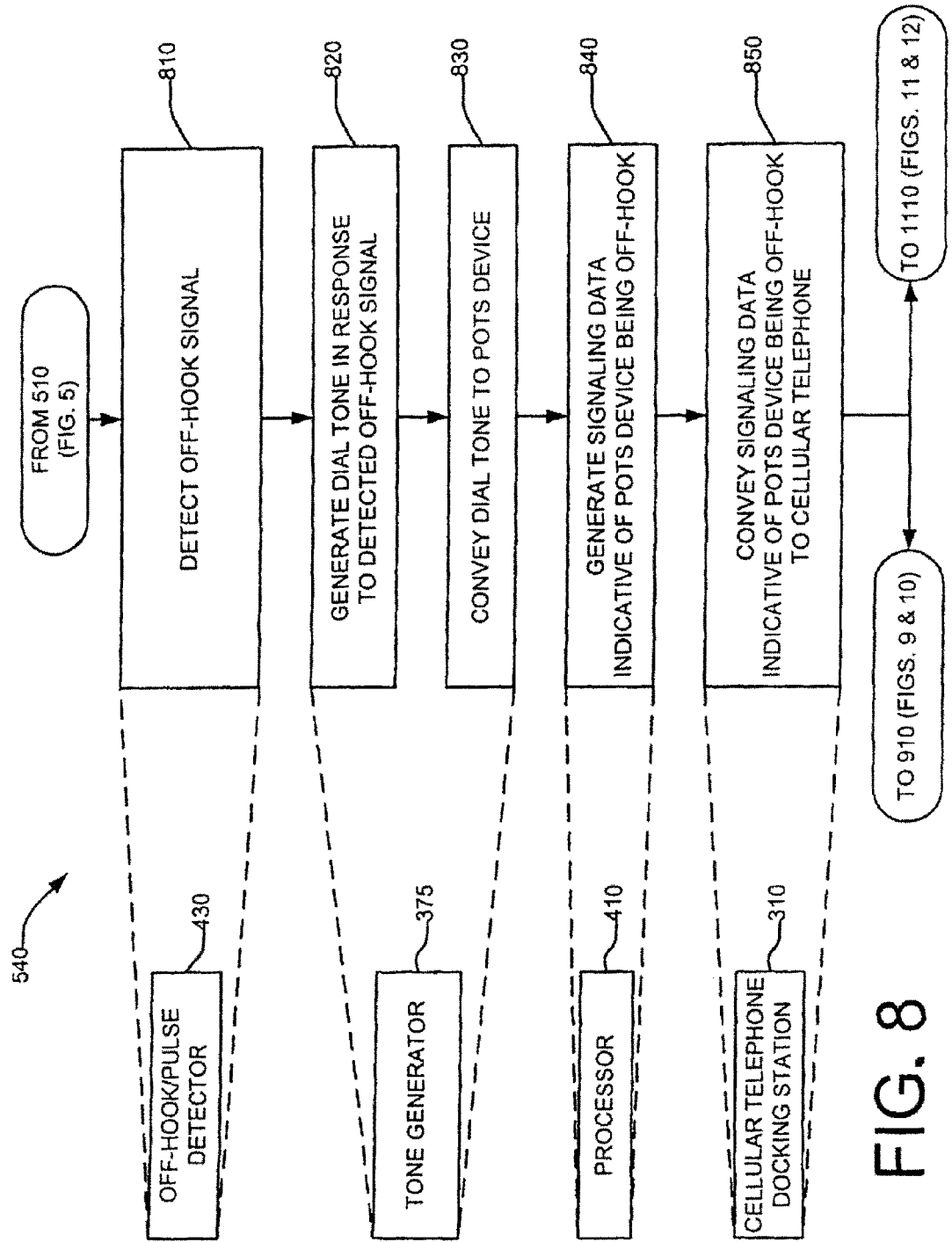
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface device 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating the 820 dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completed.

Figure 9:
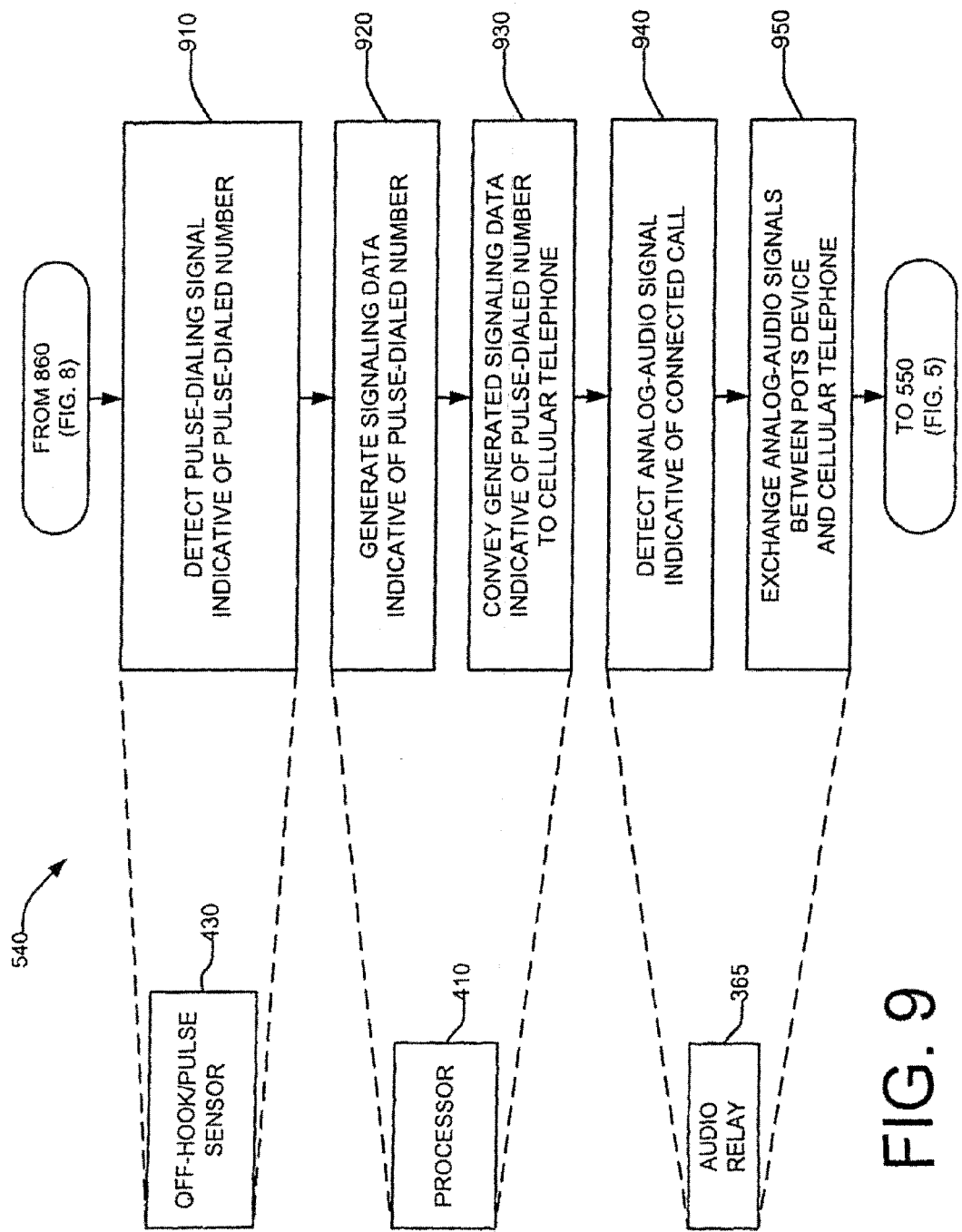
FIGS. 9 through 12 are flowcharts showing several illustrative embodiments of the method associated with the conversion of POTS compatible signals to cellular network compatible signals.
Figure 10:
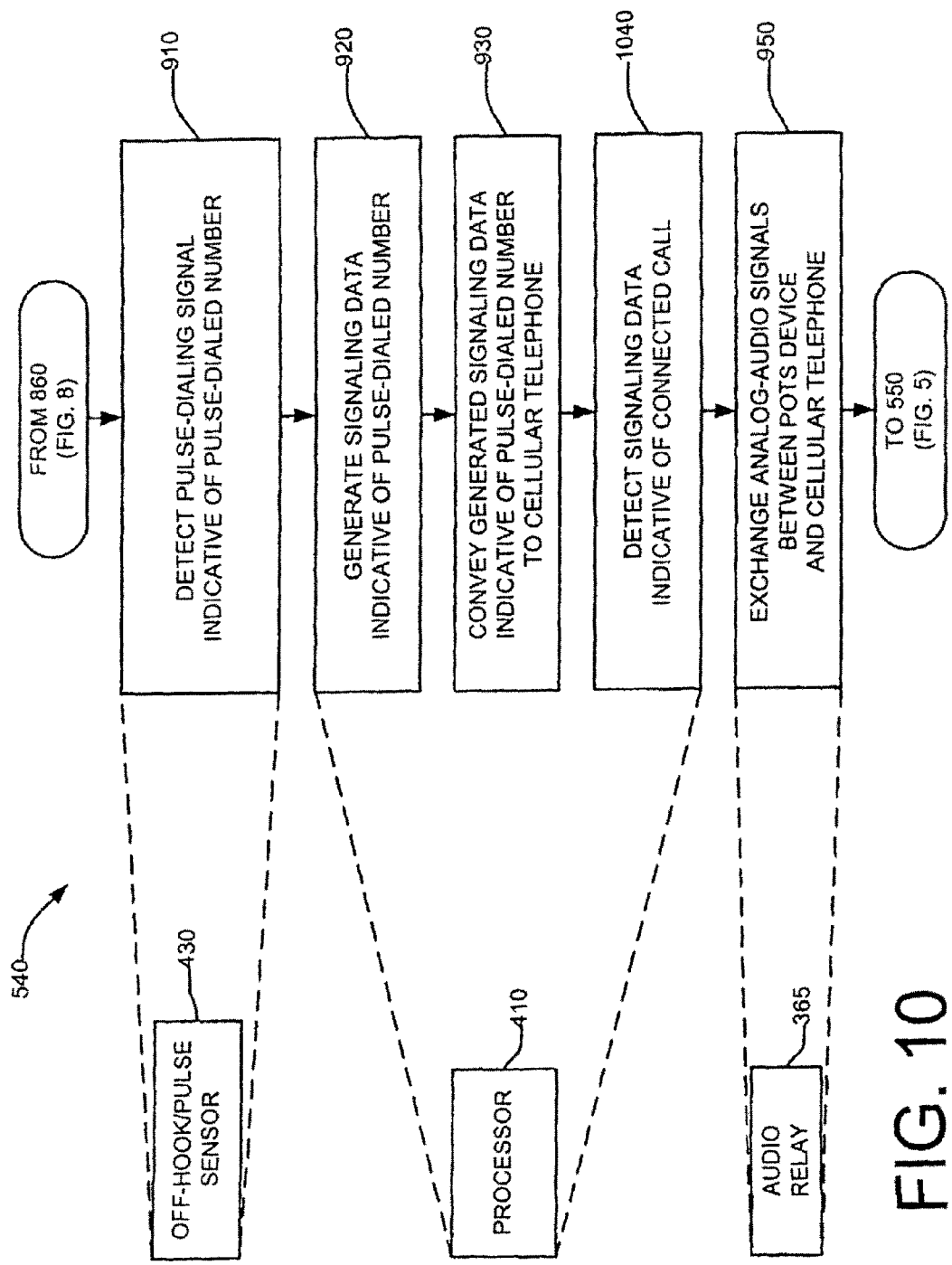

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3).

At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
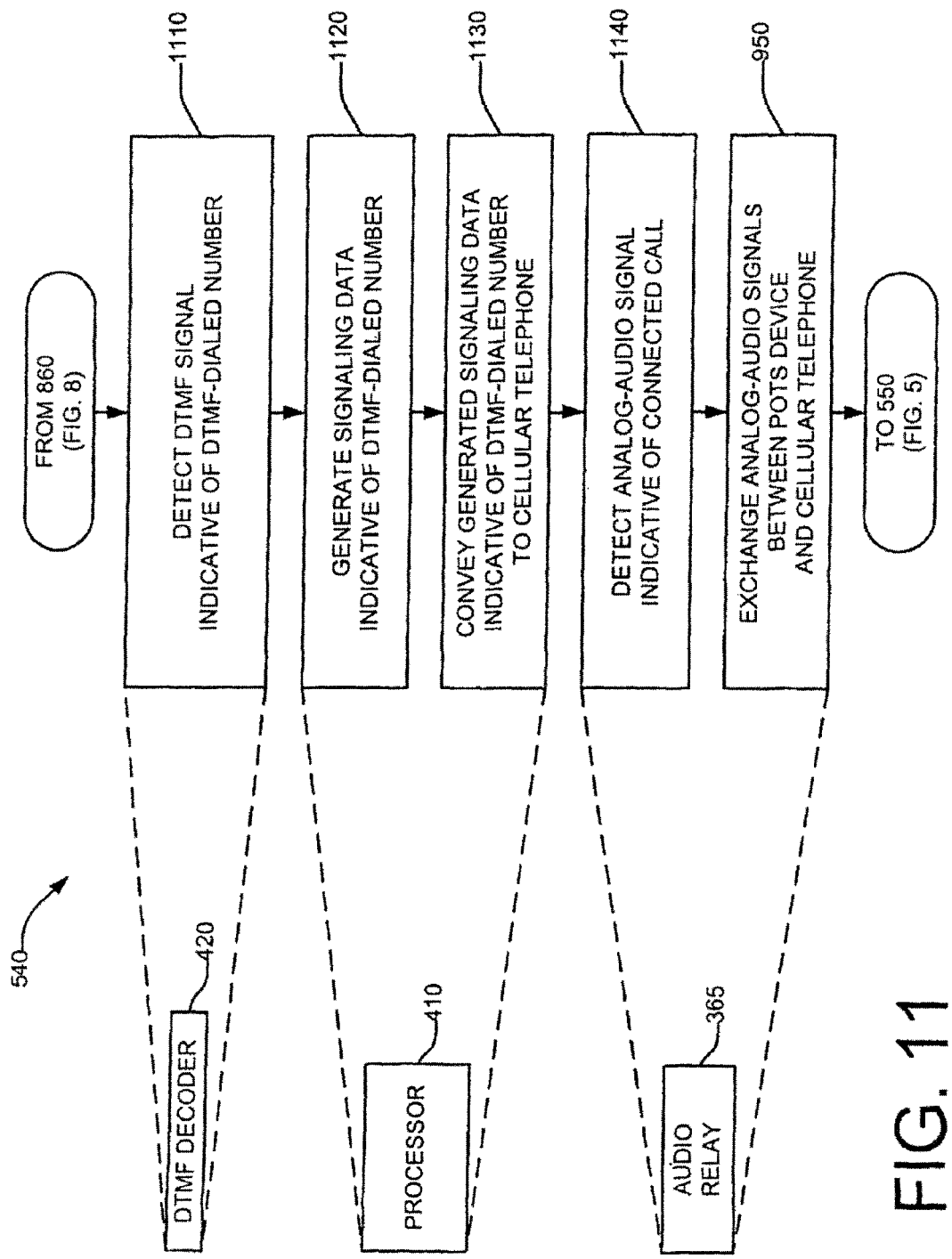
Figure 12:
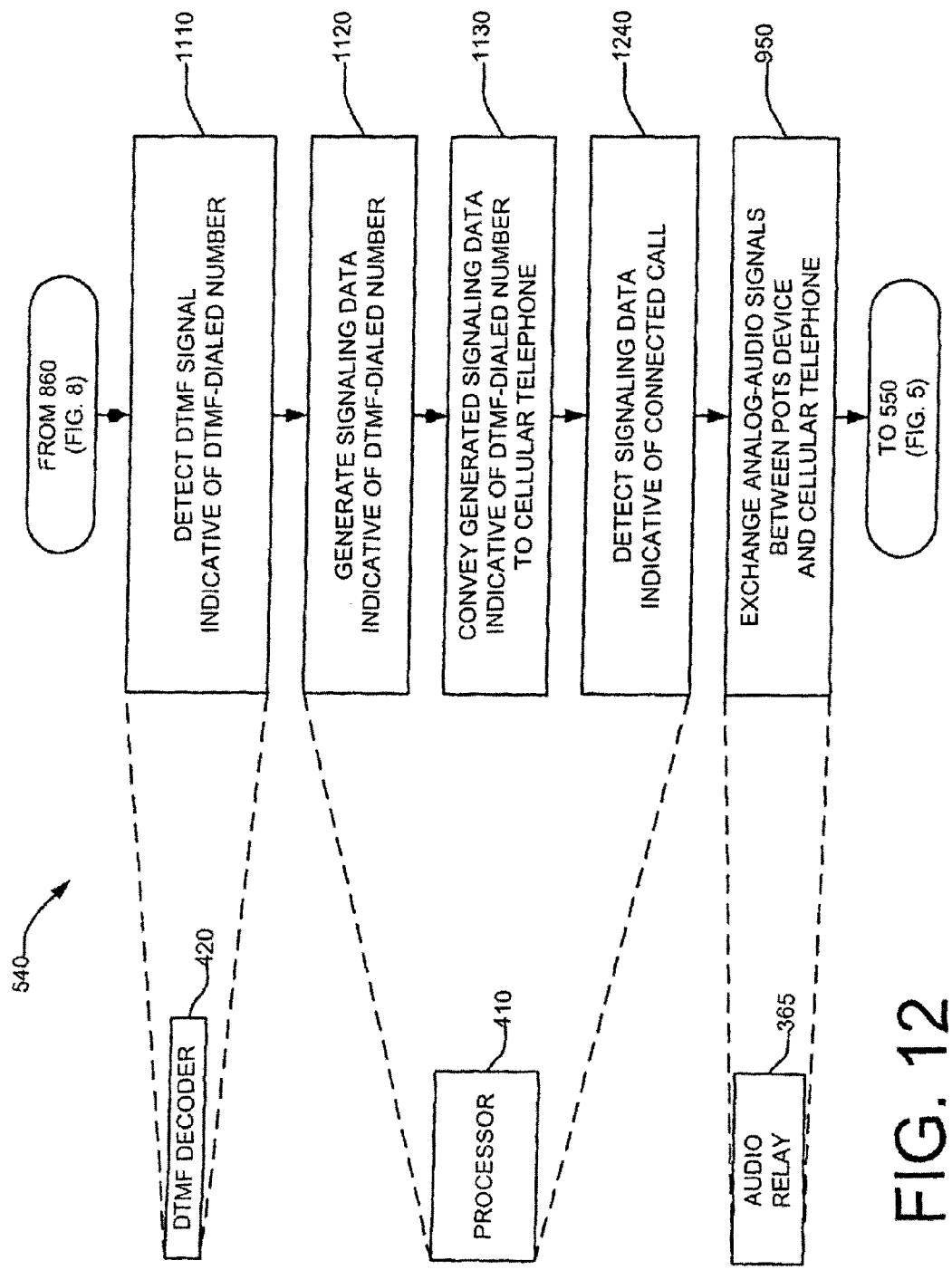

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an Application Specific Integrated Circuit (ASIC) having appropriate combinational logic gates, a Programmable Gate Array (PGA), a Field Programmable Gate Array (FPGA), etc.

Figure 13:
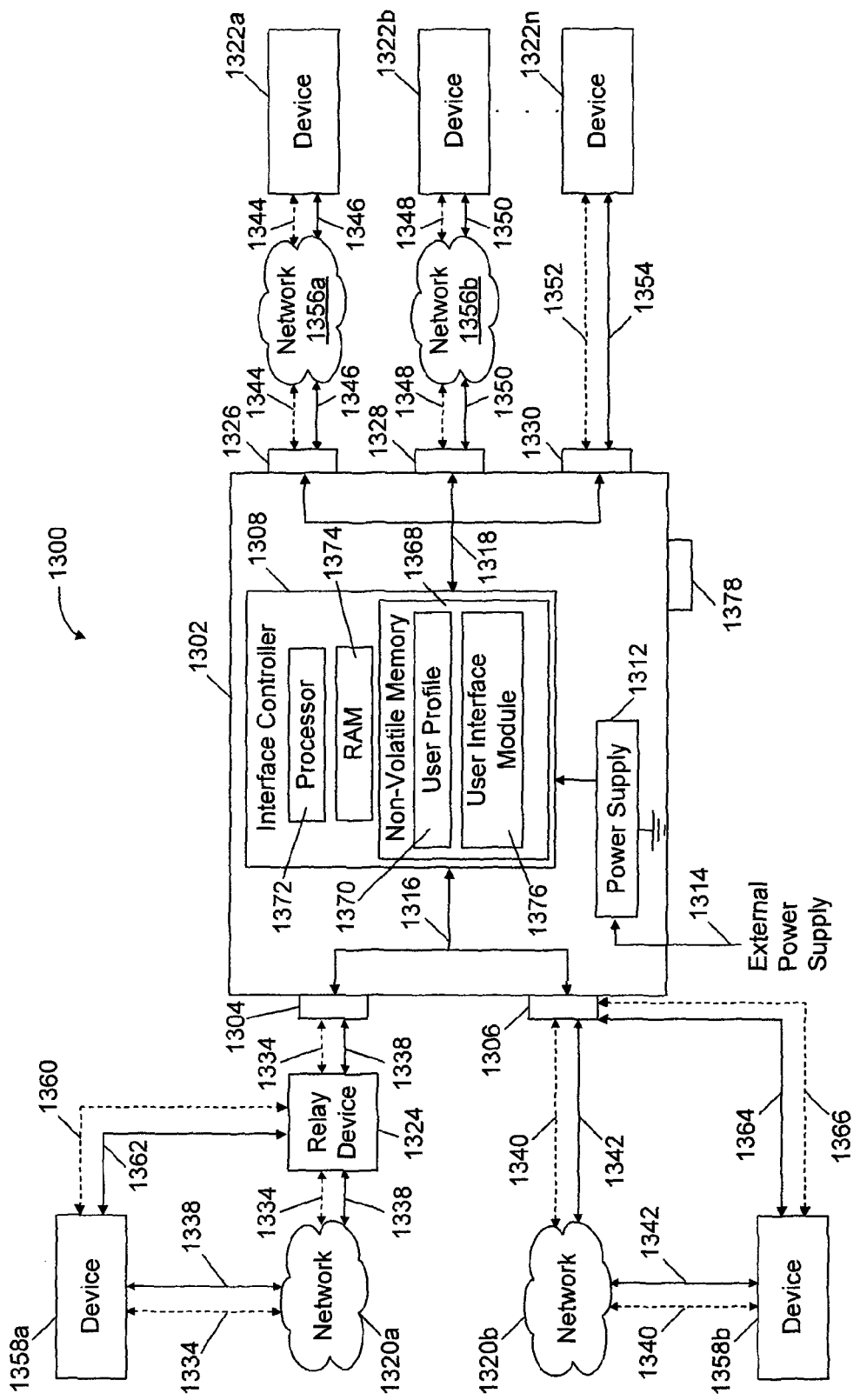
FIG. 13 is a block diagram showing an alternative illustrative embodiment of the interface device.

FIG. 13 is a block diagram showing a communications system 1300 including an interface device 1302 that is an alternative illustrative embodiment of the interface device 240 of FIG. 3. According to this embodiment, the interface device 1302 provides additional functionality, allowing any number of devices and networks to communicate with any number of additional devices and networks. In doing so, the interface device 1302 acts as a gateway for information, receiving and translating data between various formats for transmission over any type of transmission medium. As used herein, data comprises audio, video, voice, text, images, rich media, and any combination thereof.

Turning now to FIG. 13, the interface device 1302 provides communications between at least one of the devices 1358a, 1358b and at least one of the user devices 1322a-1322n. Communications provided between the devices 1358a, 1358b and the user devices 1322a-1322n via the interface device 1302 may include data comprising audio, video, voice, text, images, rich media, or any combination thereof. The devices 1358a, 1358b and the user devices 1322a-1322n may include communications devices capable of sending and receiving communications including, but not limited to, cellular telephones, VoIP phones, WI-FI phones, POTS phones, computers, Personal Data Assistants (PDAs), Digital Video Recorders (DVRs), and televisions. According to one embodiment, the devices 1358a, 1358b may be associated with communications networks 1320a, 1320b such that communications provided by the devices are sent via the communications networks, and communications directed to the devices are delivered via the communications networks. Similarly, the user devices may be associated with communications networks such that communications provided by the user devices are sent via the communications networks, and communications directed to the user devices are delivered via the communications networks as illustrated by the user devices 1322a-1322n and the communications networks 1356a, 1356b in FIG. 13. The communications networks 1320a, 1320b and 1356a, 1356b may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a Worldwide Interoperability for Microwave Access (WiMax) network, or a cellular network. Alternatively, the communications networks 1320a, 1320b and 1356a, 1356b may be a wired network such as, but not limited to, a wired Wide Area Network (WAN), a wired (Local Area Network) LAN such as the Ethernet, a wired Personal Area Network (PAN), or a wired Metropolitan Area Network (MAN).

The interface device 1302 may include at least one interface 1306 for communicating directly with the device 1358b and for communicating with the communications network 1320b associated with the device 1358b. It will be appreciated by those skilled in the art that the interface 1306 may comprise a wireline or wireless adapter for communicating with the device 1358b and with the communications network 1320b, which may include one of the wired or wireless networks described above. The interface 1306 may conform to a variety of wired network standards for enabling communications between the interface device 1302 and the device 1358b via a wired signaling connection 1364 and between the interface device and the communications network 1320b via a wired signaling connection 1342. The interface 1306 may include, but is not limited to, a coaxial cable interface conformed to MPEG standards, POTS standards, and Data Over Cable Service Specifications (DOCSIS). The interface 1306 may also conform to Ethernet LAN standards and may include an Ethernet interface, such as an RJ45 interface (not shown). The interface 1306 may further include a twisted pair interface conformed to POTS standards, Digital Subscriber Line (DSL) protocol, and Ethernet LAN standards. Moreover, the interface 1306 may include a fiber optics interface conformed to Synchronous Optical Network (SONET) standards and Resilient Packet Ring standards. It will be appreciated that the interface 1306 may also conform to other wired standards or protocols such as High Definition Multimedia Interface (HDMI).

The interface 1306 may further conform to a variety of wireless network standards for enabling communications between the interface device 1302 and the device 1358b via a wireless signaling connection 1366 and between the interface device and the communications network 1320b associated with the device via a wireless signaling connection 1340. The interface 1306 may include a cellular interface conformed to Advanced Mobile Phone System (AMPS) standards, Global System for Mobile Communications (GSM) standards, and Cellular Digital Packet Data (CDPD) standards for enabling communications between the interface device 1302 and the communications network 1320b. The interface 1306 may also include a WI-FI interface conformed to the 802.11x family of standards (such as 802.11a, 802.11b, and 802.11g). The interface 1306 may further include a WiMax interface conformed to the 802.16 standards. Moreover, the interface 1306 may include at least one of a satellite interface conformed to satellite standards or a receiver conformed to over-the-air broadcast standards such as, but not limited to, National Television System Committee (NTSC) standards, Phase Alternating Line (PAL) standards, and high definition standards. It will be appreciated that the interface 1306 may also conform to other wireless standards or protocols such as BLUETOOTH, ZIGBEE, and Ultra Wide Band (UWB). According to various embodiments, the interface device 1302 may include any number of interfaces 1306, each conformed to at least one of the variety of wired and wireless network standards described above for receiving data in a variety of formats from multiple devices and networks via multiple transmission media.

In an embodiment, the interface device 1302 may communicate with the device 1358a and with the communications network 1320a associated with the device 1358a via a relay device 1324. The relay device 1324 operates as a transceiver for the interface device 1302 to transmit and receive data to and from the device 1358a and the communications network 1320a. The relay device 1324 may modify the signaling data appropriately (e.g., amplify, attenuate, reformat, etc.), or, alternatively, the relay device 1324 may relay the signaling data without modification. Additionally, the relay device 1324 may be fixed, or may be portable to provide a user with a remote means for accessing data from a network or other device via the interface device 1302. Examples of fixed relay devices include, but are not limited to, a DSL modem, a cable modem, a set top device, and a fiber optic transceiver. Examples of portable relay devices include portable communications devices such as, but not limited to, a cellular telephone, a WI-FI telephone, a VoIP telephone, a PDA, a satellite transceiver, or a laptop.

The relay device 1324 may also include a combination of a fixed device and a portable device. For example, the relay device 1324 may comprise a cellular telephone in combination with a docking station. The docking station remains connected to the interface device 1302, through wired or wireless means, while the cellular telephone may be removed from the docking station and transported with a user. In this embodiment, data received from the interface device 1302 at the cellular telephone may be taken with the user to be utilized at a remote location. While the cellular telephone is not docked with the docking station, communication would occur between the device 1358a and the interface device 1302 as well as between the communications network 1320a and the interface device via a direct connection or via an alternate relay device.

The device 1358a may provide data via signals which are transmitted either over a wireless signaling connection 1360 or over a wired signaling connection 1362 directly to the relay device 1324. Alternatively, the communications network 1320a associated with the device 1358a may provide data via signals which are transmitted either over a wireless signaling connection 1332 or over a wired signaling connection 1336 to the relay device 1324. The data may include audio, video, voice, text, rich media, or any combination thereof. Signals provided by the device 1358a over the wireless signaling connection 1360 to the relay device 1324 and signals provided by the communications network 1320a over the wireless signaling connection 1332 to the relay device may be in a format compatible with a cellular network, a WI-FI network, a WiMax network, a BLUETOOTH network, or a satellite network. Signals provided by the device 1358a over the wired signaling connection 1362 to the relay device 1324 and signals provided by the communications network 1320a over the wired signaling connection 1336 may be in a format compatible with a DSL modem, a cable modem, a coaxial cable set top box, or a fiber optic transceiver.

Once the relay device 1324 receives data from the device 1358a or from the communications network 1320a, the relay device may transmit the data to an interface 1304 associated with the interface device 1302 via a signal over a wireless signaling connection 1334 or a wired signaling connection 1338. In one embodiment, the device 1358a and the communications network 1320a may communicate both directly with the interface device 1302 through the interface 1304 and with the interface device via the relay device 1324 through the interface 1304. The interface 1304 may conform to a variety of wireless network standards for enabling communications between the interface device 1302 and the relay device 1324. The interface 1304 may include a cellular interface conformed to AMPS, GSM standards, and CDPD standards for enabling communications between the interface device 1302 and the relay device 1324. The interface 1304 may also include a WI-FI interface conformed to the 802.11x family of standards (such as 802.11a, 802.11b, and 802.11g). The interface 1304 may further include a WiMax interface conformed to the 802.16 standards. Moreover, the interface 1304 may include at least one of a cordless phone interface or a proprietary wireless interface. It will be appreciated by one skilled in the art that the interface 1304 may also conform to other wireless standards or protocols such as BLUETOOTH, ZIGBEE, and UWB.

The interface 1304 may also conform to a variety of wired network standards for enabling communications between the interface device 1302 and the relay device 1324. The interface 1304 may include, but is not limited to, microphone and speaker jacks, a POTS interface, a USB interface, a FIREWIRE interface, a HDMI, an Enet interface, a coaxial cable interface, an AC power interface conformed to Consumer Electronic Bus (CEBus) standards and X.10 protocol, a telephone interface conformed to Home Phoneline Networking Alliance (HomePNA) standards, a fiber optics interface, and a proprietary wired interface.

Signals provided by the relay device 1324 over the wireless signaling connection 1334 to the interface 1304 may be in a format compatible with a cellular network, a WI-FI network, a WiMax network, a BLUETOOTH network, or a proprietary wireless network. Signals provided over the wired signaling connection 1338 to the interface 1304 may be in a format compatible with microphone and speaker jacks, a POTS interface, a USB interface, a FIREWIRE interface, an Enet interface, a coaxial cable interface, an AC power interface, a telephone interface, a fiber optics interface, or a proprietary wired interface.

Data received at the interfaces 1304, 1306 either directly from the devices 1358a, 1358b and the communications networks 1320a, 1320b or via the relay device 1324 is provided to an interface controller 1308 via a signaling line 1316. The interface controller 1308 is similar to the interface controller 370 of the interface device 240 described above with respect to FIG. 3. Once the interface controller 1308 receives data from the devices 1358a, 1358b or the communications networks 1320a, 1320b, the interface controller 1308 identifies one or more of the user devices 1322a-1322n and/or one or more of the communications networks 1356a, 1356b to receive the data, identifies a format compatible with the one or more receiving devices and/or receiving networks, and translates the current format of the data to the format compatible with the one or more receiving devices and/or receiving networks, which is further discussed below. After the data is translated, the interface controller 1308 provides the data to one or more of the interfaces 1326, 1328, and 1330 associated with the one or more devices and/or networks identified to receive the translated data via a signaling line 1318. For example, if the interface controller 1308 identifies a POTS telephone as the device to receive the translated data, then the interface controller provides the data via the signaling line 1318 to an interface compatible with POTS standards.

The interface controller 1308 is further configured to receive data from the user devices 1322a-1322n and the communications networks 1356a, 1356b, identify one or more of the devices 1358a, 1358b and/or one or more of the communications network 1320a, 1320b to receive the data, identify a format compatible with the one or more receiving devices and/or receiving networks, and translate the current format of the data to the format compatible with the one or more receiving devices and/or receiving networks. Thus, the interface controller 1308 provides a bi-directional communication for all data transmitted between the devices 1358a, 1358b and the user devices 1322a-1322n, between the devices 1358a, 1358b and the communications networks 1356a, 1356b, between the communications networks 1320a, 1320b and the user devices 1322a-1322n, and between the communication networks 1320a, 1320b and the communications network 1356a, 1356b. In an illustrative embodiment, the interface controller 1308 is also configured to either amplify or attenuate the signals carrying the data transmitted between the communications networks and the devices.

The interfaces 1326, 1328, and 1330 may transmit the data to the user devices 1322a-1322n directly, as illustrated by the interface 1330 in FIG. 13, or the interfaces 1326, 1328, and 1330 may transmit the data to the communications networks 1356a, 1356b associated with the devices 1322a, 1322b, as illustrated by the interfaces 1326, 1328 in FIG. 13. In either case, the interfaces 1326, 1328, and 1330 transmit the data via a signal over wired signaling connections 1346, 1350, and 1354 or wireless signaling connections 1344, 1348, and 1352, respectively. In another embodiment, one of the interfaces 1326, 1328, and 1330 may communicate the data to two or more of the devices 1322a-1322n and/or communications networks 1356a, 1356b.

The interfaces 1326, 1328, and 1330 may conform to a variety of wireless network standards for enabling communications between the interface device 1302 and the devices 1322a-1322n or the communications networks 1356a, 1356b. The interfaces 1326, 1328, and 1330 may include at least one cellular interface conformed to AMPS, GSM standards, and CDPD standards for enabling communications between the interface device 1302 and the devices 1322a, 1322b, and 1322n. The interfaces 1326, 1328, and 1330 may also include at least one WI-FI interface conformed to the 802.11x family of standards (such as 802.11a, 802.11b, and 802.11g). The interfaces 1326, 1328, and 1330 may further include at least one WiMax interface conformed to the 802.16 standards. Moreover, the interfaces 1326, 1328, and 1330 may include at least one of a cordless phone interface or a proprietary wireless interface. It will be appreciated by those skilled in the art that the interfaces 1326, 1328, and 1330 may also conform to other wireless standards or protocols such as BLUETOOTH, ZIGBEE, and UWB.

The interfaces 1326, 1328, and 1330 may also conform to a variety of wired network standards for enabling communications between the interface device 1302 and the devices 1322a-1322n or the communications networks 1356a, 1356b. The interfaces 1326, 1328, and 1330 may include, but are not limited to, microphone and speaker jacks, a POTS interface, a USB interface, a FIREWIRE interface, a HDMI, an Enet interface, a coaxial cable interface, an AC power interface conformed to CEBus standards and X.10 protocol, a telephone interface conformed to HomePNA standards, a fiber optics interface, and a proprietary wired interface.

Signals provided by the interfaces 1326, 1328, and 1330 over the wireless signaling connections 1344, 1348, and 1352 may be in a format compatible with a cellular network, a WI-FI network, a WiMax network, a BLUETOOTH network, or a proprietary wireless network. Signals provided over the wired signaling connections 1346, 1350, and 1354 may be in a format compatible with microphone and speaker jacks, a POTS interface, a USB interface, a FIREWIRE interface, an Enet interface, a coaxial cable interface, an AC power interface, a telephone interface, a fiber optics interface, or a proprietary wired interface.

For some interfaces such as, but not limited to, POTS interfaces, functionality of the interfaces that provide service from a network to a user device is different from the functionality of the interfaces that receive service from the network. Interfaces that deliver service from a network to a user device are commonly referred to as Foreign eXchange Subscriber (FXS) interfaces, and interfaces that receive service from the network are commonly referred to as Foreign eXchange Office (FXO) interfaces. In general, the FXS interfaces provide the user device dial tone, battery current, and ring voltage, and the FXO interfaces provide the network with on-hook/off-hook indications. In an embodiment, the interfaces 1326, 1328, and 1330 are the FXS interfaces that deliver data from the communications networks 1320a, 1320b to the user devices 1322a-1322n, and the interfaces 1304, 1306 are the FXO interfaces that receive data from the communications networks 1320a, 1320b.

As mentioned above, the interface controller 1308 may control the translation of the data received at the interface device 1302 from one format to another. In particular, the interface controller 1308 is configured to control the behavior of the relay device 1324 and any additional components necessary for translating data in order to effectuate the translation of the data from one format to another format. For example, as described above, for translating between POTS compatible signals and cellular network compatible signals, the interface controller 1302 may communicate with an audio relay and a tone generator, and includes an off-hook/pulse sensor and a DTMF decoder. The interface device 1302 shares the same capabilities for translating between POTS compatible signals and cellular network compatible signals as described above with regard to the interface device 240 illustrated in FIG. 3, but the interface device 1302 also has additional translation capabilities for translating between any number and type of other signals. Consequently, the interface device 1302 may comprise any components necessary for a given translation.

According to one embodiment, the interface controller 1308 comprises a processor 1372, RAM 1374, and non-volatile memory 1368 including, but not limited to, ROM and SRAM. The non-volatile memory 1368 is configured to store logic used by the interface controller 1308 to translate data received at the interface device 1302. In this sense, the non-volatile memory 1368 is configured to store the program that controls the behavior of the interface controller 1308, thereby allowing the interface controller 1308 to translate data signals from one format to another. In an embodiment, the non-volatile memory 1368 may include a user interface module 1376 containing one or more user interfaces for interacting with the interface device 1302, as will be discussed further below. The non-volatile memory 1368 is also adapted to store configuration information and may be adapted differently depending on geographical area and signal formats and protocols. The configuration information stored on the non-volatile memory 1368 of the interface controller 1308 may include default configuration information originally provided on the interface device 1302.

In another embodiment, the configuration information stored on the non-volatile memory 1368 may include a user profile 1370 associated with one or more of the devices 1322a-1322n, one or more of the communications networks 1356a, 1356b, or a combination thereof. The user profile 1370 may include user preferences established by one or more users of the interface device 1302 regarding formats in which data is to be transmitted and received, translations to be performed on the data, the devices and networks to send and receive the data, as well as any other configuration information associated with transmitting data via the interface device 1302. The RAM 1374 is configured to store temporary data during the running of the program by the processor 1372, allowing the RAM to operate as a memory buffer for times in which the data is being received at a rate that is faster than the interface device 1302 can determine a proper recipient, translate the data, and transmit the data to the proper recipient. The processor 1372 is configured to generate signaling data on the signaling line 1316, which may instruct the relay device 1324 to dial a number, connect to a network, etc.

As mentioned above, the interface device 1302 contains logic within the interface controller 1308 that is used by the interface controller to translate data received at the interface device. The logic may include any number and type of data translation standards. In particular, the interface controller 1308 uses the logic to translate the data received at one of the interfaces 1304, 1306, 1326, 1328, 1330 of the interface device 1302 from at least one format to at least one other format. How the data received at the interface device 1302 is translated may be based on any one or combination of factors. According to one embodiment, the type of data translation may depend on the source and destination of the data. It should be understood that although the description contained herein describes the devices 1358a, 1358b and the communications networks 1320a, 1320b as the source devices and the source networks, respectively, and the user devices 1322a-1322n and the communications networks 1356a, 1356b as the destination devices and the destination networks, respectively, embodiments contemplate data transfer from the user devices 1322a-1322n and from the communications networks 1356a, 1356b to the devices 1358a, 1358b and to the communications networks 1320a, 1320b as well as bidirectional communication and data transfer. As an example, data arriving at the interface device 1302 that is directed to a POTS device would be translated to a format compatible for transmission over the appropriate medium associated with the POTS device.

According to another embodiment, the type of data translation may depend on default configuration information originally provided on the interface device 1302. For example, the default configuration information may be provided by a service provider offering the interface device 1302 to customers. In yet another embodiment, the type of data translations may depend on the user profile 1370 stored on the interface device 1302. As discussed above, the user profile 1370 may be configured by a user of the interface device 1302 to include user preferences regarding formats in which data is to be transmitted and received, translations to be performed on the data, the devices and networks to send and receive the data, as well as any other configuration information associated with transmitting data via the interface device 1302.

When configuring the user profile 1370, the user may specify the appropriate destination device, transmission medium, and filtering options for data received under any variety of circumstances. For example, the user may configure the interface device 1302 such that all incoming rich media content is translated for transmission to and display on the device 1322b which, as discussed above, may include a television. The user might configure the interface device 1302 such that only media from specific websites be allowed to download to a device or network via the interface device 1302. In doing so, the user profile 1370 might include access data such as a user name and password that will be required from the user prior to accessing a specific type or quantity of data. The user profile 1370 may additionally contain priorities for translation and transmission when multiple data signals and data formats are received at the interface device 1302. For example, a user may specify that audio data be given transmission priority over other types of data. The priority may be based on a specific transmitting or receiving device, the type of transmitting or receiving device, the format of the data being transmitted or received, the transmission medium of the transmitting or receiving signals, or any other variable. As used herein, the format associated with the data may include a transmission medium associated with the signal carrying the data, a standard associated with the data, or the content of the data. The user profile 1370 may be configured by a user via a user interface provided by the interface device 1302 in response to a request received through one or more of the interfaces 1304, 1306, 1326, 1328, 1330 or a user input interface 1372 to interact with the interface device. The user input interface 1372 may include, but is not limited to, at least one mouse interface, at least one touchpad interface, at least one motion sensor interface, at least one touchscreen interface, or at least one keyboard interface. It should be understood by one skilled in the art that the interface device 1302 may include a plurality of user input interfaces.

It should be understood by one skilled in the art that data translations as discussed above may include several different types of data conversion. First, translating data may include converting data from a format associated with one transmission medium to another transmission medium. For example, audio data from an incoming telephone call may be translated from a wireless, cellular signal to a twisted pair wiring signal associated with POTS telephones. Next, data translation may include converting data from one type to another, such as when voice data from a telephone or network is translated into text data for display on a television or other display device. For example, data translation may include, but is not limited to, MPEG 2 translation to MPEG 4 or the reverse, Synchronized Multimedia Interface Language (SMIL) translation to MPEG 1, or Macromedia Flash to MPEG 4.

Additionally, data translation may include content conversion or filtering such that the substance of the data is altered. For example, rich media transmitted from one or more of the devices 1358a, 1358b or one or more of the communications networks 1320a, 1320b may be filtered so as to extract only audio data for transmittal to one or more of the user devices 1322a-1322n or one or more of the communications networks 1356a, 1356b. Translation may further include enhancing the data, applying equalizer settings to the data, improving a poor quality signal carrying data based on known characteristics of the device providing the data signal, degrading the data signal, or adding a digital watermark to the data to identify the device or the network associated with the data or the user sending the data. Translation may further include adding information to the data and annotating the data. Moreover, translation may include any combination of the above types of data conversions.

In one embodiment, data received at the interface controller 1308 may include a request for data. It should be understood that the request may be dialed telephone numbers, an IP address associated with a network or device, or any other communication initiating means. When a request for data is provided by one of the user devices 1322a-1322n, the devices 1358a, 1358b, the communications networks 1320a, 1320b, or the communications networks 1356a, 1356b, the interface controller 1308 receives the request and converts the request to a digital command. The digital command is transmitted as signaling data either on the signaling line 1316 to one or more of the interfaces 1304, 1306 or on the signaling line 1318 to one or more of the interfaces 1326, 1328, and 1330 based on the devices and/or communications networks identified to receive the request. Once received at one or more of the interfaces 1304, 1306 or one or more of the interfaces 1326, 1328, and 1330, the signaling data is transmitted to the destination devices and/or communications networks either directly or via the relay device 1324. If the signaling data is transmitted to the relay device 1324, the signaling data instructs the relay device to make the required connection to the identified devices 1358a, 1358b and/or the identified communications networks 1320a, 1320b.

When a connection is made between the device 1358a and one or more of the user devices 1322a-1322n, between the device 1358a and one or more of the communications networks 1356a, 1356b, between the communications network 1320a and one or more of the user devices 1322a-1322n, or between the communication network 1320a and one or more of the communications network 1356a, 1356b in response to a request for data, the relay device 1324 detects the connection and conveys a signal to the interface controller 1308. In this illustrative embodiment, in response to receiving the signal from the relay device 1324, the interface controller 1308 enables bi-directional communication of the requested data. If one of the devices and/or communications networks that requested the data disconnects, then the disconnect is detected by the interface controller 1308. In this illustrative embodiment, the interface controller 1308 terminates the bi-directional communication by generating another signal which instructs the relay device 1324 to stop transmission and reception of the data. If, on the other hand, the relay device 1324 disconnects, then this is detected by the interface controller 1308 which, in response, terminates the bi-directional communication by stopping transmission and reception of the data.

While hardware components are shown with reference to FIG. 13 to describe the interface controller 370, it will be clear to one of ordinary skill in the art that the interface controller 370 may be implemented in hardware, software, firmware, or a combination thereof. In one illustrative embodiment, the interface controller 1308 is implemented in software or firmware that is stored in a memory and that is executed by a suitable instruction execution system. If implemented in hardware, as in FIG. 13, the interface controller 1308 may be implemented with any or a combination of the following technologies including, but not limited to, a discrete logic circuit having logic gates for implementing logic functions upon data signals, an ASIC having appropriate combinational logic gates, a PGA, a FPGA, other adaptive chip architectures, etc.

The power supply 1312 is configured to provide the components of the interface device 1302 with the requisite power similar to the power supply 335 discussed above in view of FIG. 3. In this sense, the power supply 1312 is connected to an external power supply 1314 from which it receives external power. The external power is converted by the power supply 1312 to a DC voltage, which is used to power the components of interface device 1302 and optionally, the relay device 1324.

Figure 14:
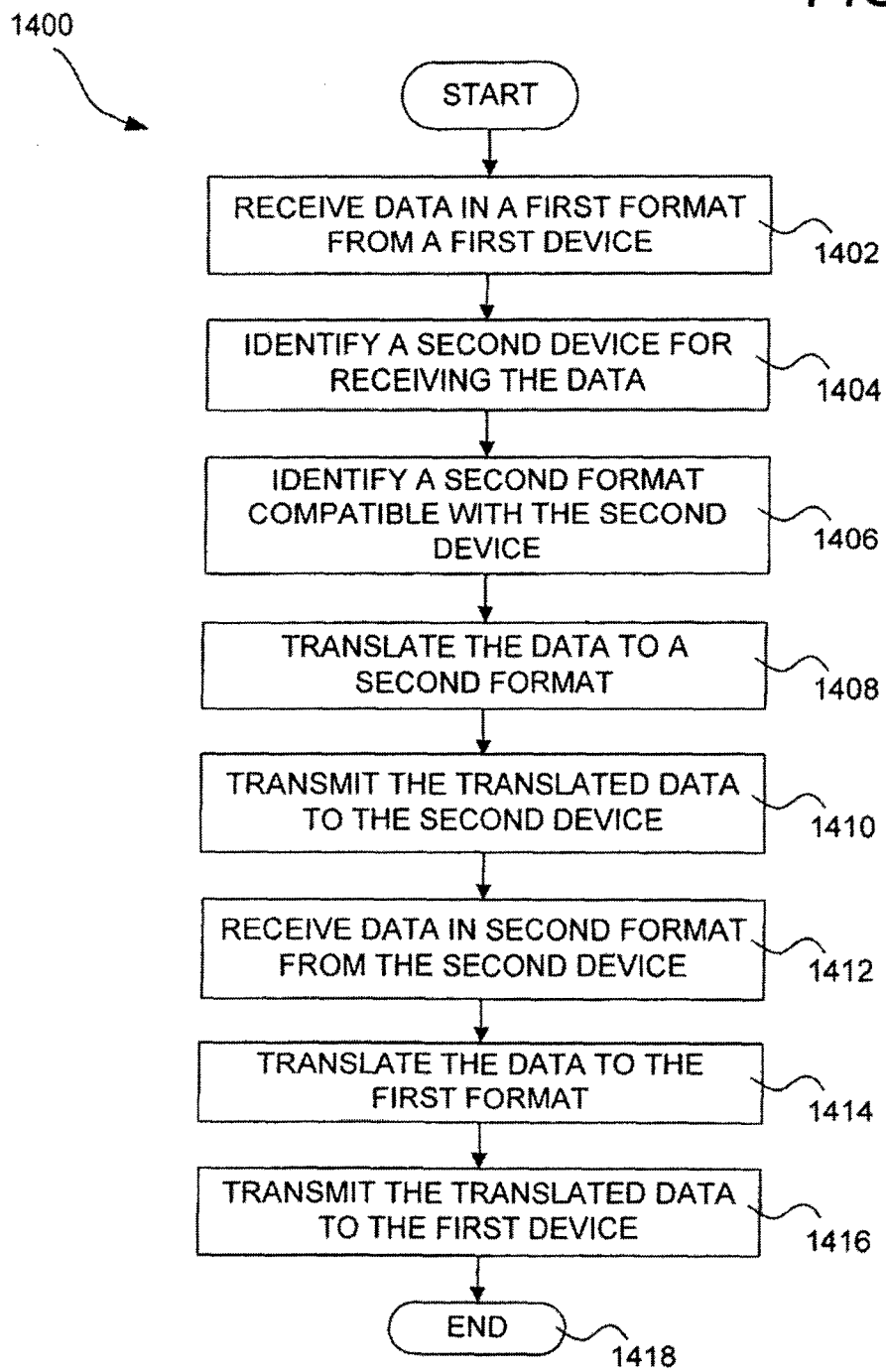
FIG. 14 is a flowchart showing an illustrative embodiment of the method and computer-readable medium associated with providing bi-directional communications between a first device and a second device.

Referring now to FIG. 14, additional details regarding the operation of the interface device 1302 for providing communications between a first device and a second device will be discussed. It should be appreciated that the logical operations of the various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing exemplary embodiments. Accordingly, the logical operations of FIG. 14 and other flow diagrams and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of exemplary embodiments as recited within the claims attached hereto.

The routine 1400 begins at operation 1402, where data is received in a first format from a first device 1322*a*. The data is received at an interface 1304 of interface device 1302. The interface device 1302 identifies a second device 1322*b* for receiving the data at operation 1404. This identification may depend upon the user profile 1370 stored within the interface device 1302. Alternatively, identifying a second device may comprise selecting a second device that is compatible with the signal type or transmission medium corresponding to the data received at interface 1304. After identifying the second device 1322*b*, the interface device 1302 identifies a second format compatible with the second device 1322*b* at operation 1406. Similarly, this process may be based on the user profile 1370 or on the characteristics of the second device 1322*b*. For example, the second device may be selected based on the user profile 1370 that instructs a POTS telephone to receive all media received at interface 1304. Because the POTS telephone does not have the capability to display video, the interface device 1302 may identify the second format as containing only the audio portion of the received media.

At operation 1408, the data is translated to the second format for transmittal to the second device 1322*b*. The data is then transmitted to the second device 1322*b* at operation 1410. The communications capabilities of interface device 1302 are bi-directional. At operation 1412, data is received in a second format from the second device 1322*b*. This data is translated to the first format at operation 1414. After transmitting the translated data to the first device 1322*a* at operation 1416, the routine 1400 continues to operation 1418, where it ends.

Figure 15:
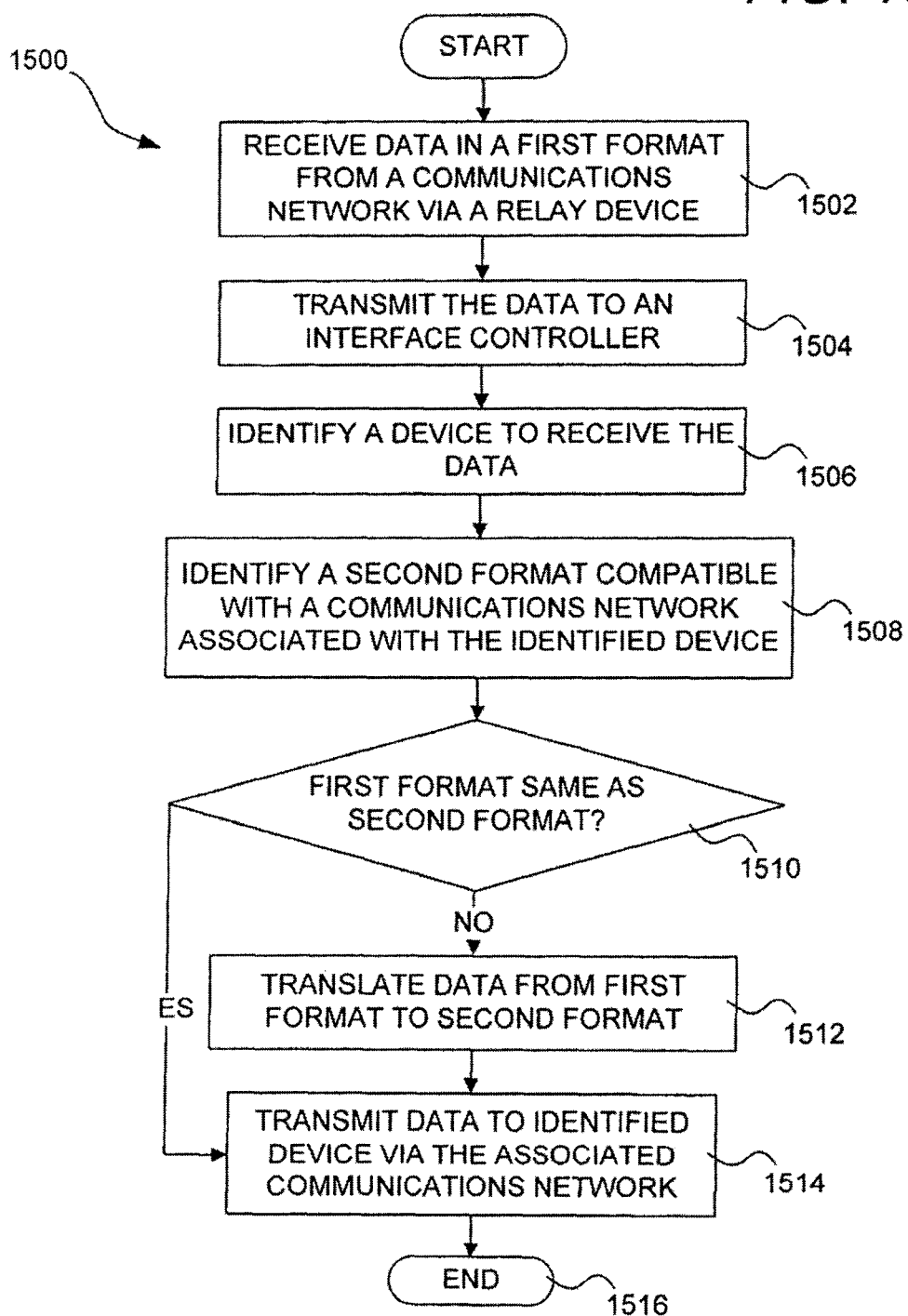
FIG. 15 is a flowchart showing an illustrative embodiment of the method and computer-readable medium associated with interfacing devices with communications networks.

Turning now to FIG. 15, an illustrative routine 1500 will be described illustrating a process for interfacing devices with communications networks. The routine 1500 begins at operation 1502, where the interface 1304 associated with the interface device 1302 receives data in a first format from the communications network 1320*a* via the relay device 1324. As discussed above, the interface 1304 may conform to a variety of wireless or wired network standards such that the interface may receive a variety of types of data via a variety of types of signals.

Once the data is received at the interface 1304, the routine 1500 continues to operation 1504, where the data is transmitted via the signaling line 1316 to the interface controller 1308. At operation 1506, the interface controller 1308 identifies at least one of the devices 1322*a*-1322*n* to receive the data from the communications network 1320*a*. As discussed above in view of FIG. 13, the interface controller 1308 may identify which of the devices 1322*a*-1322*n* should receive the data based on compatibility with the communications networks associated with each of the devices, the user profile 1370 stored on the interface device 1302, or instructions from the communications network 1320*a* that provided the data as to which of the devices should receive the data.

After the interface controller 1308 identifies at least one of the devices 1322*a*-1322*n* to receive the data, the routine 1500 proceeds to operation 1508, where the interface controller 1308 identifies a second format compatible with the communications network associated with the at least one device identified from the devices 1322*a*-1322*n* to receive the data. The routine 1500 then proceeds to operation 1510, where the interface controller 1308 determines whether the first format of the data is the same as the second format compatible with the communications network associated with the at least one device identified from the devices 1322*a*-1322*n* to receive the data. If the formats are the same, then the routine 1500 proceeds to operation 1514. If the formats are not the same, then the routine 1500 proceeds to operation 1512, where the interface controller 1308 translates the data from the first format to the second format compatible with the communications network associated with the at least one device identified from the devices 1322*a*-1322*n* to receive the data. The routine 1500 then proceeds to operation 1514.

At operation 1514, the interface controller 1308 transmits the data, whether translated or not, through at least one of the interfaces 1326, 1328, and 1330 associated with the at least one device identified from the devices 1322*a*-1322*n* to the device identified from the devices 1322*a*-1322*n* to receive the data via either a wireless or wired signaling connection. As discussed above with regard to FIG. 13, the interfaces 1326, 1328, and 1330 may be conformed to a variety of wired and wireless network standards so that the interfaces can transmit a variety of types of data via a variety of types of signals. From operation 1514, the routine 1500 continues to operation 1516, where it ends.

In another embodiment, the interface device 1302 may power up or power down one or more of the devices 1322*a*-1322*n* based on the presence or absence of the relay device 1324. Thus, when the relay device 1324 is present, the interface device 1302 is able to power up one or more of the devices 1322*a*-1322*n* to allow data to be transmitted between the relay device and the devices. According to one embodiment, the interface device 1302 may determine whether the relay device 1324 is present or not based on whether the interface device is connected to the interface 1304. As discussed above, the relay device 1324 may connect to the interface 1304 of the interface device 1302 via either the wireless signaling connection 1334 or the wired signaling connection 1338. If the relay device 1324 connects to the interface 1304 via the wireless signaling connection 1334, the interface device 1302 may be able to determine if the relay device is present by detecting a signal associated with the relay device. For example, if the relay device 1324 connects to the interface 1304 via BLUETOOTH connectivity, then the interface device 1302 may monitor for a BLUETOOTH signal from the relay device to determine if the relay device is present. If the interface device 1302 detects a BLUETOOTH signal associated with the relay device 1324, then the interface device recognizes that the relay device is present. Loss of the BLUETOOTH signal associated with the relay device 1324 instructs the interface device 1302 that the relay device is no longer present.

In another example, the relay device 1324 may be a cellular telephone that continuously broadcasts a signal containing a Media Access Control (MAC) address. If the interface device 1302 detects the broadcasted MAC address associated with the relay device 1324, then the interface device recognizes that the relay device is present. Once the interface device 1302 no longer detects the broadcasted MAC address associated with the relay device 1324, then the interface device recognizes that the relay device is no longer present. On the other hand, if the relay device 1324 is connected to the interface 1304 via the wired signaling connection 1338, the interface device 1302 may detect whether the relay device is present by detecting a draw of current associated with the interface 1304. When the relay device 1324 is connected via the wired signaling connection 1338, the relay device will draw current from the power supply 1312 of the interface device 1302, allowing the interface device to detect that the relay device is present. When the draw of current is lost, the interface device 1302 recognizes that the relay device 1324 is no longer present.

In response to determining that the relay device 1324 is present, the interface device is configured to power up one or more of the devices 1322*a*-1322*n*. According to one embodiment, the interface device 1302 may power up one or more of the devices 1322*a*-1322*n* by providing a signal to an emitter (not shown), such as an infrared emitter, associated with one or more of the devices. The emitter receives the power up signal from the interface device 1302 and transmits the power up signal to the associated device, instructing the associated device to power up. Similarly, in response to determining that the relay device 1324 is no longer present, the interface device 1302 may provide another signal to the emitter instructing the device associated with the emitter to power down. According to another embodiment, the interface device 1302 may power up and down one or more of the devices 1322*a*-1322*n* via a signal provided directly to the devices. If one or more of the devices 1322*a*-1322*n* is in a low power state, then the interface device 1302 may provide a signal directly to the devices via one or more of the interfaces 1326, 1328, and 1330 instructing the devices to power up in response to a determination that the relay device 1324 is present. Once the interface device 1302 determines that the relay device 1324 is no longer present, the interface device may provide another signal directly to the one or more device 1322*a*-1322*n* instructing the devices to power down back to the low power state.

In another embodiment, the non-volatile memory 1368 of the interface device 1302 may store a user interface module 1376 including one or more user interfaces for interacting with the interface device. As discussed above, the non-volatile memory 1368 may include ROM, SRAM, a combination thereof, or any other non-volatile memory. According to an embodiment, each of the user interfaces stored in the user interface module 1376 is associated with at least one of the interfaces 1304, 1306, 1326, 1328, 1330, or 1372 of the interface device 1302. A list of the interfaces and the associated user interfaces may be stored in the non-volatile memory 1368. The user interfaces stored in the user interface module 1376 are associated with the interfaces 1304, 1306, 1326, 1328, 1330, and 1372 of the interface device 1302 based on the capability of the user interfaces to be displayed on devices associated with the interfaces. Accordingly, if each interface is conformed to a different standard, then each interface may be associated with a different user interface. If two or more interfaces are conformed to similar standards, then these interfaces may be associated with the same user interface. For example, the interfaces 1304, 1306, 1326, and 1328 may be associated with a user interface configured for display on network compatible devices such as, but not limited to, cellular telephones and laptops, while the interface 1372 may be associated with a user interface configured for display on a screen (not shown) associated with the interface device 1302. As discussed above, the interfaces 1304, 1306, 1326, 1328, and 1330 may include, but are not limited to, a coaxial cable interface, an Ethernet interface, a twisted pair interface, a fiber optics interface, a cellular interface, a WI-FI interface, a WiMax interface, a satellite interface, an over-the-air interface, and a BLUETOOTH interface. Further, the interface 1372 may include, but is not limited to, a mouse interface, a touchpad interface, a motion sensor interface, or a touchscreen interface. Thus, the interface module 1376 may include user interfaces configured for display on a device associated with each of the types of interfaces listed above.

When a request to interact with the interface device 1302 is received by the interface controller 1308, the interface controller identifies the interface through which the request was received and then selects the user interface associated with the identified interface from the user interface module 1376. In one embodiment, the interface controller 1308 accesses the list of the interfaces and associated user interfaces stored on the nonvolatile memory 1368 to determine which user interface corresponds to the interface through which the request was received. The request to interact with the interface device 1302 may originate from one of the devices 1358*a*, 1358*b*, 1322*a*-1332*n*, a device 1374 associated with the user input interface 1372, or the relay device 1324. As discussed above, the devices 1358*a*, 1358*b*, and 1322*a*-1322*b* may include, but are not limited to, cellular telephones, VoIP phones, WI-FI phones, POTS phones, computers, PDAs, DVRs, and televisions. The relay device 1324 may include a DSL modem, a cable modem, a set top device, a fiber optic transceiver, a cellular telephone, a docking station and a cellular telephone, a WI-FI telephone, a VoIP telephone, a PDA, a satellite transceiver, or a laptop. The device 1374 associated with the user input interface 1372 may include, but is not limited to, a mouse, a keyboard, a touchpad, a motion sensor, or a touchscreen interface. The request may be received at one of the interfaces 1304, 1306, 1326, 1328, or 1330 directly from one of the devices 1358*a*, 1358*b*, 1322*a*, 1322*b*, or 1374 or via one of the communications networks 1320*a*, 1320*b*, 1356*a*, or 1325*b*.

The request to interact with the interface device 1302 may include a numerical code, a spoken command, a body motion, selection of a button associated with one of the devices 1358*a*, 1358*b*, 1322*a*-1322*n*, 1324, or 1374, or any other means recognizable as a request to access a user interface. Once the interface controller 1308 selects the associated user interface, the interface controller provides the associated user interface to the interface through which the request was received for transmittal of the associated user interface to a device associated with the interface. In one embodiment, the device may be the device from which the request originated.

As noted above, the user interfaces provided by the interface controller 1308 are used to interact with the interface device 1302. According to one embodiment, the user interfaces are configured to receive user input requesting access to further data stored on the non-volatile memory 1368. In particular, the user interfaces may be used to access the user profile 1370 associated with the interface device 1302 in order to review as well as to configure the data stored therein. For example, a user may employ the user interface to specify the appropriate destination device, transmission medium, and filtering options for data received by the interface controller 1308 as well as to specify the translation and transmission priorities to be applied when multiple data signals and data formats are received by the interface controller. The user may also utilize the user interface to configure the interface device 1302 such that only media from specific websites be allowed to download to a device or network via the interface device. Moreover, the user interfaces may be used to access the user profile 1370 to configure access data such as a user name and password that will be required from a user prior to accessing a specific type or quantity of data and to configure translation and transmission priorities stored on the user profile.

Figure 16:
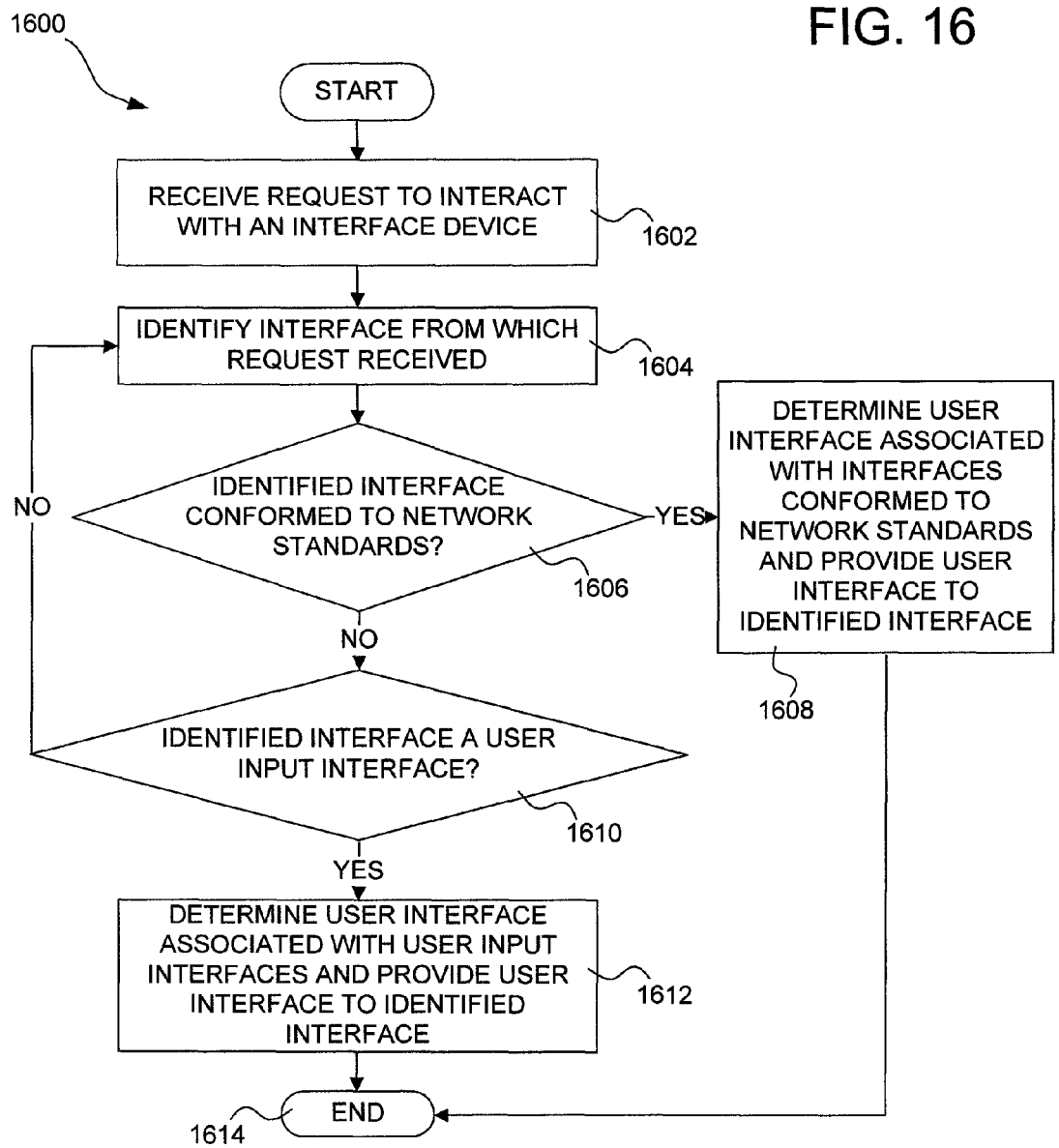
FIG. 16 is a flowchart showing an illustrative embodiment of the method associated with providing a user interface for facilitating communications between devices.

Turning now to FIG. 16, an illustrative routine 1600 will be described illustrating a process for providing a user interface for facilitating communications between devices. The routine 1600 begins at operation 1602, where the interface controller 1308 receives a request to interact with the interface device. As discussed above, the request may include a numerical code, a spoken command, a body motion, selection of a button associated with one of the devices 1358*a*, 1358*b*, 1322*a*-1322*n*, 1324, or 1374, or any other means recognizable as a request to access a user interface.

Once the interface controller 1308 receives the request, the routine 1600 proceeds to operation 1604, where the interface controller identifies the interface from which the request to interact with the interface device 1302 was received. The routine 1600 then proceeds to operation 1606, where the interface controller 1308 determines whether the identified interface is an interface conformed to network standards. If the identified interface is an interface conformed to network standards, then the routine 1600 proceeds to operation 1608, where the interface controller 1308 determines a user interface associated with interfaces conformed to network standards from the list of the interfaces and associated user interfaces stored in the non-volatile memory 1368 and provides the associated user interface to the identified interface. From operation 1608, the routine 1600 proceeds to operation 1614, where it ends.

On the other hand, if at operation 1606, the interface controller 1308 determines that the identified interface is not an interface conformed to network standards, then the routine 1600 proceeds to operation 1610, where the interface controller determines whether the identified interface is a user input interface. If the interface controller 1308 determines that the identified interface is not a user input interface, then the routine 1600 proceeds back up to operation 1604, where the interface controller 1308 re-identifies the interface from which the request was received. If, on the other hand, the interface controller 1308 determines that the identified interface is a user input interface, then the routine 1600 proceeds to operation 1612, where the interface controller 1308 determines a user interface associated with user input interfaces from the list of the interfaces and associated user interfaces stored in the non-volatile memory 1368 and provides the associated user interface to the identified interface. From operation 1612, the routine 1600 proceeds to operation 1614, where it ends.

It will be appreciated that embodiments provide apparatus and methods for providing a user interface for facilitating communications between devices. Although exemplary embodiments have been described in language specific to computer structural features, methodological acts and by computer-readable media, it is to be understood that the exemplary embodiments defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to exemplary embodiments without following the example embodiments and applications illustrated and described herein, and without departing from the true spirit and scope of the exemplary embodiments, which are set forth in the following claims.

What is claimed is:

1. An interface device for providing communications between a first device and a second device, the interface device comprising:
 a relay device that receives data in a first format from the first device;
 a first interface connectable to the relay device via a wired signaling connection, the first interface receiving the data in the first format from the relay device, the first interface associated with a first user interface capable of being displayed on the first device;
 a processor; and
 a memory that stores instructions that, when executed by the processor, cause the processor to perform operations comprising
  determining that the relay device is connected to the first interface by detecting a draw of current associated with the first interface,
  in response to determining that the relay device is connected to the first interface, instructing the second device to power up,
  identifying the second device for receiving the data,
  identifying a second format compatible with the second device,
  translating the data to the second format,
  transmitting the data as translated to the second device via a second interface, the second interface associated with a second user interface capable of being displayed on the second device,
  receiving a first request to configure further data stored in a user profile stored on the interface device, wherein the further data comprises translations to be performed on data received and comprises identities of devices and networks to send data to and receive data from,
  upon determining that the first request was received via the first interface of the interface device,
   accessing a list of interfaces of the interface device, the list of interfaces associated with user interfaces,
   locating the first interface of the interface device in the list of interfaces and determining that the first interface is associated with the first user interface,
   selecting the first user interface to be displayed at the first device to receive first user input for configuring the further data stored on the interface device, and
   providing the first user interface to the first interface,
  configuring the further data by updating the translations to be performed on data received and updating the identities of devices and networks to send data to and receive data from based on the first user input, and
  receiving a second request to configure priorities, stored in the user profile, for translation and transmission when multiple data signals and data formats are received at the interface device.

2. The interface device of claim 1, further comprising a user input interface comprising at least one of a mouse interface, a touchpad interface, a motion sensor interface, or a touch-screen interface.

3. The interface device of claim 1, wherein the first interface and the second interface comprise at least one of a computer interface or a cellular telephone interface.

4. The interface device of claim 1, wherein the interface device is located in a home.

5. The interface device of claim 1, wherein the first device is associated with a first communications network and the second device is associated with a second communications network and wherein the first communications network is a wireless communications network and the second communications network is a wired communications network.

6. The interface device of claim 1, wherein the memory stores further instructions that, when executed by the processor, cause the processor to perform operations comprising enhancing the data, applying equalizer settings to the data, improving a signal carrying the data based on known characteristics of the first device, degrading the signal carrying the data, and adding a digital watermark to the data.

7. The interface device of claim 1, wherein identifying the second device for receiving the data is based on the user profile.

8. A method for providing communications between a first device and a second device, the method comprising:

receiving, at a relay device associated with an interface device, data in a first format from the first device;

receiving, at a first interface of the interface device, the data in the first format from the relay device, the relay device connectable to the first interface via a wired signaling connection and the first interface associated with a first user interface capable of being displayed on the first device;

determining, by the interface device, that the relay device is connected to the first interface by detecting a draw of current associated with the first interface;

in response to determining that the relay device is connected to the first interface, instructing, by the interface device, the second device to power up;

identifying, by the interface device, the second device for receiving the data;

identifying, by the interface device, a second format compatible with the second device;

translating, by the interface device, the data to the second format;

transmitting, by the interface device, the data as translated to the second device via a second interface of the interface device, the second interface associated with a second user interface capable of being displayed on the second device;

receiving, at the interface device, a first request to configure further data stored in a user profile stored on the interface device, wherein the further data comprises translations to be performed on data received and comprises identities of devices and networks to send data to and receive data from;

upon determining that the first request was received via the first interface of the interface device,
 accessing, by the interface device, a list of interfaces of the interface device, the list of interfaces associated with user interfaces,
 locating, by the interface device, the first interface of the interface device in the list of interfaces and determining that the first interface is associated with the first user interface,
 selecting, by the interface device, the first user interface to be displayed at the first device to receive first user input for configuring the further data stored on the interface device, and
 providing, by the interface device, the first user interface to the first interface;

configuring, by the interface device, the further data by updating the translations to be performed on data received and updating the identities of devices and networks to send data to and receive data from based on the first user input; and receiving, at the interface device, a second request to configure priorities, stored in the user profile, for translation and transmission when multiple data signals and data formats are received at the interface device.

9. The method of claim 8, further comprising enhancing the data, applying equalizer settings to the data, improving a signal carrying the data based on known characteristics of the first device, degrading the signal carrying the data, and adding a digital watermark to the data.

10. The method of claim 8, wherein the first interface and the second interface comprise at least one of a computer interface or a cellular telephone interface.

11. The method of claim 8, wherein the interface device is located in a home.

12. The method of claim 8, wherein the first device is associated with a first communications network and the second device is associated with a second communications network and wherein the first communications network is a wireless communications network and the second communications network is a wired communications network.

13. The method of claim 8, wherein identifying the second device for receiving the data is based on the user profile.

14. A non-transitory computer-readable medium storing instructions that, when executed by a processor of an interface device, cause the processor to perform operations comprising:

receiving, at a first interface of the interface device, data in a first format from a first device, the data in the first format from the first device received at the first interface via a relay device, the relay device connectable to the first interface via a wired signaling connection and the first interface associated with a first user interface capable of being displayed on the first device;

determining that the relay device is connected to the first interface by detecting a draw of current associated with the first interface;

in response to determining that the relay device is connected to the first interface, instructing a second device to power up;

identifying the second device for receiving the data;

identifying a second format compatible with the second device;

translating the data to the second format;

transmitting the data as translated to the second device via a second interface of the interface device, the second interface associated with a second user interface capable of being displayed on the second device;

receiving a first request to configure further data stored in a user profile stored on the interface device, wherein the further data comprises translations to be performed on data received and comprises identities of devices and networks to send data to and receive data from;

upon determining that the first request was received via the first interface of the interface device,
 accessing a list of interfaces of the interface device, the list of interfaces associated with user interfaces,
 locating the first interface of the interface device in the list of interfaces and determining that the first interface is associated with the first user interface
 selecting the first user interface to be displayed at the first device to receive first user input for configuring the further data stored on the interface device, and
 providing the first user interface to the first interface;

configuring the further data by updating the translations to be performed on data received and updating the identities of devices and networks to send data to and receive data from based on the first user input; and receiving a second request to configure priorities, stored in the user profile, for translation and transmission when multiple data signals and data formats are received at the interface device.

15. The non-transitory computer-readable medium of claim 14, wherein the operations further comprise enhancing the data, applying equalizer settings to the data, improving a signal carrying the data based on known characteristics of the first device, degrading the signal carrying the data, and adding a digital watermark to the data.

16. The non-transitory computer-readable medium of claim 14, wherein the first interface and the second interface comprise at least one of a computer interface or a cellular telephone interface.

17. The non-transitory computer-readable medium of claim 14, wherein the interface device is located in a home.

18. The non-transitory computer-readable medium of claim 14, wherein the first device is associated with a first communications network and the second device is associated with a second communications network and wherein the first communications network is a wireless communications network and the second communications network is a wired communications network.

19. The non-transitory computer-readable medium of claim 14, wherein the interface device is located in a business.

20. The non-transitory computer-readable medium of claim 14, wherein identifying the second device for receiving the data is based on the user profile.

* * * * *